(12) United States Patent
Koo et al.

(10) Patent No.: US 12,544,740 B2
(45) Date of Patent: Feb. 10, 2026

(54) PHOTOCATALYST, CATALYST FILTER, CATALYST MODULE, AND AIR PURIFICATION SYSTEM INCLUDING THE SAME

(71) Applicant: Samsung Electronics Co., Ltd., Suwon-si (KR)

(72) Inventors: Minseok Koo, Suwon-si (KR); Hyukjae Kwon, Suwon-si (KR); Dongsik Yang, Suwon-si (KR); Hyun Chul Lee, Suwon-si (KR); Jongmin Lee, Suwon-si (KR); Sangmin Ji, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 523 days.

(21) Appl. No.: 18/158,714

(22) Filed: Jan. 24, 2023

(65) Prior Publication Data
US 2024/0058793 A1     Feb. 22, 2024

(30) Foreign Application Priority Data
Aug. 18, 2022     (KR) .................. 10-2022-0103340

(51) Int. Cl.
*A62B 7/08*        (2006.01)
*B01D 53/00*       (2006.01)
(Continued)

(52) U.S. Cl.
CPC ............ *B01J 23/72* (2013.01); *B01D 53/007* (2013.01); *B01D 53/8668* (2013.01); *B01D 53/885* (2013.01); *B01J 21/063* (2013.01); *B01J 35/23* (2024.01); *B01J 35/39* (2024.01); *B01J 35/50* (2024.01); *B01J 35/56* (2024.01); *B01J 35/613* (2024.01); *B01J 35/615* (2024.01); *B01J 35/617* (2024.01); *B01D 2255/20707* (2013.01);
(Continued)

(58) Field of Classification Search
CPC ........... A61L 9/00; A61L 9/22; B01D 53/007; B01D 53/885; B01J 35/56
USPC ...................................... 422/121–122, 186.3
See application file for complete search history.

(56) References Cited

U.S. PATENT DOCUMENTS

| 10,898,880 B2 | 1/2021 | Zedan et al. |
| 2016/0089659 A1 | 3/2016 | Yi et al. |

(Continued)

FOREIGN PATENT DOCUMENTS

| CN | 106466604 A | 3/2017 |
| CN | 112657332 A | 4/2021 |

(Continued)

OTHER PUBLICATIONS

Extended European Search Report issued date Sep. 18, 2023 of EP Patent Application No. 23155521.0.

*Primary Examiner* — Monzer R Chorbaji
(74) *Attorney, Agent, or Firm* — CANTOR COLBURN LLP

(57) ABSTRACT

A photocatalyst including a first metal oxide; and a second metal oxide, wherein the first metal oxide is disposed on a surface of the second metal oxide, and wherein absorbance of the photocatalyst in a wavelength region of about 200 nanometers (nm) to about 600 nm is about 5% to about 50% greater than an absorbance of $TiO_2$ in the wavelength region of about 200 nm to about 600 nm.

27 Claims, 15 Drawing Sheets

(51) Int. Cl.
  *B01D 53/86* (2006.01)
  *B01D 53/88* (2006.01)
  *B01J 19/08* (2006.01)
  *B01J 21/06* (2006.01)
  *B01J 23/72* (2006.01)
  *B01J 35/23* (2024.01)
  *B01J 35/39* (2024.01)
  *B01J 35/50* (2024.01)
  *B01J 35/56* (2024.01)
  *B01J 35/61* (2024.01)

(52) U.S. Cl.
  CPC .............. *B01D 2255/20761* (2013.01); *B01D 2255/802* (2013.01); *B01D 2257/708* (2013.01); *B01D 2259/804* (2013.01)

(56) References Cited

U.S. PATENT DOCUMENTS

| | | |
|---|---|---|
| 2016/0263559 A1 | 9/2016 | Seo et al. |
| 2017/0274364 A1 | 9/2017 | Idriss et al. |
| 2022/0016305 A1 | 1/2022 | De Duonni et al. |

FOREIGN PATENT DOCUMENTS

| | | | | |
|---|---|---|---|---|
| CN | 111359450 B | 2/2022 | | |
| JP | 2004181301 A | 7/2004 | | |
| JP | WO 2015/002324 A1 * | 1/2015 | .............. | A61L 9/00 |
| JP | 5898944 B2 | 3/2016 | | |
| WO | 2015002324 A1 | 1/2015 | | |

\* cited by examiner

PHOTOCATALYST, CATALYST FILTER, CATALYST MODULE, AND AIR PURIFICATION SYSTEM INCLUDING THE SAME

CROSS-REFERENCE TO RELATED APPLICATION

This application claims priority to and the benefit of Korean Patent Application No. 10-2022-0103340, filed on Aug. 18, 2022, in the Korean Intellectual Property Office, and all the benefits accruing therefrom under 35 U.S.C. § 119, the content of which is incorporated by reference herein in its entirety.

BACKGROUND

1. Field

The present subject matter relates to a photocatalyst, a catalyst filter, a catalyst module, and an air purification system that includes the photocatalyst.

2. Description of the Related Art

To remove pollutants in the air, methods of adsorbing/removing gaseous pollutants with an adsorbent (for example, activated carbon) having a large specific surface area in conjunction with an air purification filter are known. However, these absorption/removal methods have disadvantages. For example, secondary pollution may be created when the absorbed gas pollutants are desorbed. In some systems, a separate regeneration process, such as heating at a high temperature, may be required to regenerate the adsorbent, and/or the performance of an adsorbent may be rapidly degraded in the presence of moisture.

A photocatalyst is a material capable of removing gaseous pollutants by inducing oxidation/reduction reactions of electrons and holes that are formed when a catalyst receives light of at least a certain energy. Among such photocatalysts, a $TiO_2$-containing photocatalyst utilizes a method of decomposing gaseous pollutants by oxidizing gaseous pollutants into carbon dioxide. However, the $TiO_2$ photocatalysts may have a limited catalyst efficiency because electrons and holes generated by light may rapidly recombine before the $TiO_2$ materials are able to come into contact with a gaseous pollutant.

Therefore, there is a continuing need for a photocatalyst that does not release secondary pollution by desorption of gaseous pollutants, does not use a separate regeneration process such as heating at a high temperature, and continuously removes gas pollutants by using oxidation/reduction reactions at high efficiency regardless of the presence of moisture.

SUMMARY

Provided is a photocatalyst having improved absorption of light in the entire wavelength regions of ultraviolet (UV) light and visible light, having a high decomposition efficiency and a high removal efficiency for gaseous volatile organic compounds (VOCs) regardless of the presence of moisture, and having a high reaction rate with such species.
Provided is a catalyst filter including the photocatalyst.
Provided is a catalyst module including the catalyst filter.
Provided is an air purification system including the catalyst module.

Additional aspects will be set forth in part in the description that follows and, in part, will be apparent from the detailed description, or may be learned by practice of the presented exemplary embodiments described herein.

According to an aspect, a photocatalyst includes:
a first metal oxide; and
a second metal oxide,
wherein the first metal oxide is disposed on a surface of the second metal oxide, and
wherein absorbance of the photocatalyst in a wavelength region of about 200 nanometers (nm) and about 600 nm is about 5% to about 50% greater than an absorbance of $TiO_2$ in the wavelength region of about 200 nanometers to about 600 nanometers.

According to another aspect, a catalyst filter includes:
a porous ceramic support, and
the photocatalyst disposed on a surface of the porous ceramic support.

According to another aspect, a catalyst module includes:
the catalyst filter, and
an energy supply source,
wherein the energy supply source supplies energy to the catalyst filter for catalyst activation.

According to another aspect, an air purification system includes:
a supplier that supplies air containing a volatile organic compound, and
an air purifier comprising the catalyst module,
wherein the air purification system substantially decomposes and substantially removes the volatile organic compound from the air supplied from the supplier, and discharges a purified air from which the volatile organic compound is substantially decomposed and substantially removed.

BRIEF DESCRIPTION OF THE DRAWINGS

The above and other aspects, features, and advantages of certain exemplary embodiments will be more apparent from the following detailed description taken in conjunction with the accompanying drawings, in which.

DETAILED DESCRIPTION

Figure 1A:
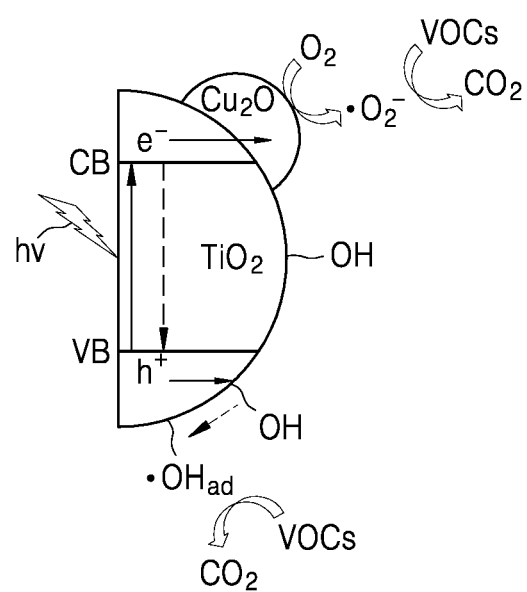
FIG. 1A is a schematic diagram showing the surface photochemistry of a photocatalyst for air purification according to one or more embodiments.

Reference will now be made in further detail to exemplary embodiments, examples of which are illustrated in the accompanying drawings, wherein like reference numerals refer to like elements throughout. In this regard, the present exemplary embodiments may have different forms and should not be construed as being limited to the detailed descriptions set forth herein. Accordingly, the exemplary embodiments are merely described in further detail below, and by referring to the figures, to explain certain aspects. As used herein, the term "and/or" includes any and all combinations of one or more of the associated listed items. Expressions such as "at least one of," when preceding a list of elements, modify the entire list of elements and do not modify the individual elements of the list.

The present description described hereinbelow may have various modifications and various embodiments, example embodiments will be illustrated in the drawings and more fully described in the detailed description. The present subject matter, however, should not be construed as being limited to the example embodiments set forth herein, and rather, should be understood as covering all modifications, equivalents, or alternatives falling within the scope of the present subject matter.

The terms used herein is for the purpose of describing particular embodiments only, and is not intended to be limiting the present inventive concept. An expression used in the singular encompasses the expression of the plural, unless it has a clearly different meaning in the context.

The expression "at least one" or "one or more" as used herein in front of components is meant to supplement a list of all components means, and does not imply to supplement individual components of the description. The term "combination" as used herein includes, unless otherwise described, a mixture, an alloy, a reaction product, or the like. The terms "comprise/comprising" and "include/including" as used herein do not exclude other components unless otherwise described, and mean that other components may be further included. The terms such as "first," "second," etc. used as used herein may be used to distinguish one component from another without indicating order, quantity, or importance. Unless otherwise indicated or otherwise clearly described by context, components should be construed to include both the singular and the plural. The expression "or" includes, unless otherwise specified, the meaning of "and/or".

The term "one or more embodiments" or the like means that a specific component described in connection with one or more embodiments is included in at least one embodiment described herein, and that the specific component may or may not be present in other exemplary embodiments. In addition, components described herein should be construed as being possibly combined in any suitable manner in the various exemplary embodiments.

Unless otherwise stated, all percentages, parts, ratios, and the like are by weight. In addition, when an amount, concentration, or other values or parameters are given in a range, a preferable range, or a list of preferable upper limits or preferable lower limits, it is to be understood that, regardless of whether the range is separately disclosed, all ranges formed from any upper range limits, or preferred values and any lower range limits, or any pair of preferred values are also included.

When a range of numerical values is stated herein, unless otherwise stated, the range is intended to include the endpoints and all integers and fractions within the range. The scope of the detailed description is intended not to be limited by specific values when defining the range.

Unless otherwise specified, the unit "parts by weight" refers to a weight ratio between each component, and the unit "parts by mass" refers to a value obtained by converting a weight ratio between each component into a solid content.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used in the present specification have the same meaning as commonly understood by those skilled in the art. In addition, terms such as terms defined in commonly used dictionaries should be interpreted to have meanings consistent with the meaning in the related art and as used herein, and should not be construed as being idealized. Alternatively, the terms should not be interpreted in an excessively formal sense.

It will be understood that when an element is referred to as being "on" another element, it can be directly in contact with the other element or intervening elements may be present therebetween. In contrast, when an element is referred to as being "directly on" another element, there are no intervening elements present.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Exemplary embodiments are described with reference to cross-sectional views that are schematic diagrams of idealized embodiments. Accordingly, the appearance of examples may vary, for example, as a result of manufacturing techniques and/or tolerances. Therefore, embodiments described herein should not be construed as being limited to the specific shape of the regions described herein, but should include, for example, variations in shape occurring during manufacturing. For example, regions illustrated or described as flat regions may generally have rough and/or non-linear characteristics. Also, an illustrated acute angle may be round. Therefore, regions illustrated in drawings are schematic in nature, and shapes thereof are not intended to illustrate the precise shape of the regions and are not intended to limit the scope of the claims.

Hereinafter, a photocatalyst, a catalyst filter, a catalyst module, and an air purification system that includes the photocatalyst will be described in further detail in the exemplary embodiments herein.

According to an aspect, a photocatalyst includes a first metal oxide; and a second metal oxide, wherein the first metal oxide is disposed on a surface of the second metal oxide, and wherein absorbance of the photocatalyst in a wavelength region of about 200 nanometers (nm) to about 600 nm is about 5% to about 50% greater than an absorbance of $TiO_2$ in the wavelength region of about 200 nm to about 600 nm.

FIG. 1A is a schematic diagram for explaining the structure and operation principle of the photocatalyst according to one or more embodiments.

Referring to FIG. 1A, the photocatalyst may have, for example, a structure in which a second metal oxide including a first metal oxide, for example, $Cu_2O$, is disposed on a surface of the second metal oxide (i.e., $TiO_2$). In other words, the first metal oxide (e.g., $Cu_2O$, or the like) is disposed on a surface of the second metal oxide (e.g., $TiO_2$, or the like).

When the surface of the second metal oxide is irradiated with light (e.g., ultraviolet (UV) light) having an energy that is greater than the band gap energy, electrons are transferred from the valence band to the conduction band and pairs of electrons ($e^-$) and holes ($h^+$) may be generated. Holes ($h^+$) that are generated in the valence band may contribute to an oxidation reaction and react with water molecules adsorbed on the surface to generate hydroxyl radicals (OH), or, through a direct reaction, organic substances, for example, gaseous volatile organic compounds (VOCs) may be oxidized. Electrons ($e^-$) generated in the conduction band may cause a reduction reaction of oxygen molecules to form superoxide ions ($O_2^-$), and through several additional reactions, hydroxyl radicals (·OH) may be generated. By the hydroxyl radicals (·OH) generated by the holes ($h^+$) and electrons ($e^-$), the gaseous VOCs may be decomposed into carbon dioxide and water. However, if the photocatalyst included the second metal oxide without the first metal oxide disposed on a surface thereof, electrons and holes may rapidly recombine, so that the efficiency of the photocatalyst may be reduced.

In the photocatalyst according to one or more embodiments, the electrons of the first metal oxide may have a relatively narrower band gap between the valence band and the conduction band than that of the electrons in the second metal oxide. In this regard, the photocatalyst may have properties of oxidizing and decomposing the gaseous VOCs, even when irradiation is conducted in the visible light wavelength region. The first metal oxide is disposed on (or immersed in) a surface of the second metal oxide so that many of the electrons ($e^-$) that are generated on the surface of the second metal oxide may be adsorbed by the first metal oxide. As a result, as the number of the holes ($h^+$) of the first metal oxide increases, the oxidation reaction increases, and accordingly, the oxidation of the gaseous VOCs may be promoted, and the decomposition and removal efficiency and removal reaction rates of the gaseous VOCs may be increased. In addition, based on excellent charge transfer at the interface between the second metal oxide and the first metal oxide, more electrons may be involved in a reduction reaction from the gaseous VOCs to carbon dioxide, thereby increasing the energy conversion rate. Accordingly, the absorbance of the photocatalyst is in a wavelength region of UV and visible light, as described herein.

The absorbance of the photocatalyst in a wavelength region of about 200 nm to about 600 nm is about 5% to about 50% greater than an absorbance of $TiO_2$ in the wavelength region of about 200 nm to about 600 nm. For example, the absorbance of the photocatalyst according to one or more embodiments in a wavelength region of about 200 nm to about 600 nm may be greater than an absorbance of $TiO_2$ in the wavelength region of about 200 nm to about 600 nm by about 6% to about 49%, about 7% to about 48%, about 8% to about 47%, about 9% to about 46%, about 10% to about 45%, or about 10% to about 44%.

The absorbance of the photocatalyst according to one or more embodiments at a wavelength region of about 200 nm to about 400 nm may be greater than an absorbance of $TiO_2$ in the wavelength region of about 200 nm to about 400 nm by at least about 30%. For example, the absorbance of the photocatalyst in a wavelength region of about 200 nm to about 400 nm may be about 30% to about 400% greater than an absorbance of $TiO_2$ in the wavelength region of about 200 nm to about 400 nm. This may be confirmed by Analysis Example 2 and FIG. 4 to be described hereinbelow. The wavelength may be, for example, a wavelength of 254 nm, 320 nm, 365 nm, or 420 nm, but is not limited thereto.

An oxidation number of the first metal of the first metal oxide may be +1. The first metal oxide having an oxidation number of +1 may be unstable in the atmosphere, and may facilitate the transfer of electrons from the surface of the second metal oxide to the first metal oxide.

Figure 1B:
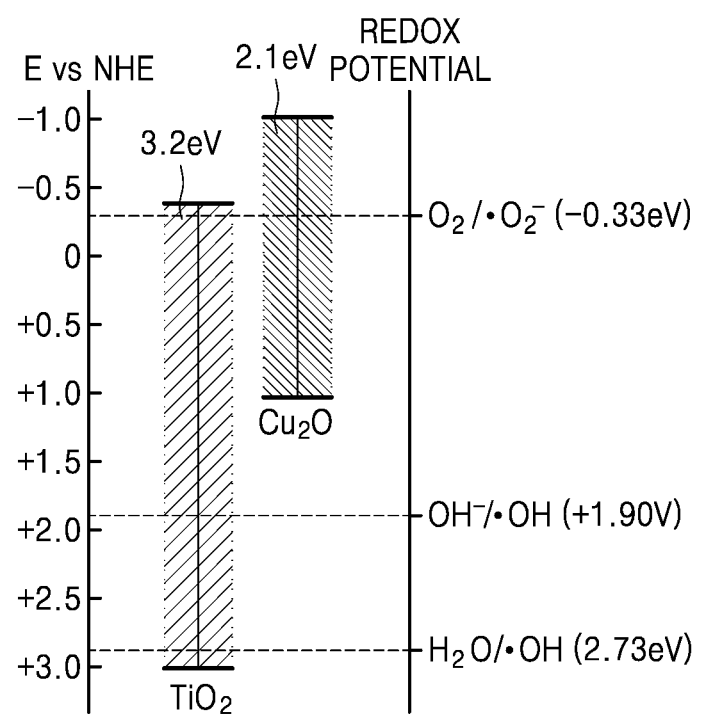
FIG. 1B is a bandgap energy diagram of a first metal oxide and a second metal oxide in a photocatalyst according to one or more embodiments.

FIG. 1B shows reduction potentials (vs. NHE) of the first metal oxide and the second metal oxide of the photocatalyst according to one or more embodiments.

Referring to FIG. 1B, the band gap energy of the first metal oxide having an oxidation number of +1, for example, $Cu_2O$, may be about 2.1 eV. The band gap energy of the first metal oxide having an oxidation number of +1 may be narrower than about 3.2 eV, which is the band gap energy of the second metal oxide, e.g., $TiO_2$ (anatase-type), but may be wider than about 1.8 eV, which is the band gap energy of copper oxide, e.g., CuO, having an oxidation number of +2. Thus, since the first metal oxide having an oxidation number of +1 has a high charge separation and a high absorbance in the wavelength regions compared to a metal oxide having an oxidation number of +2, the photocatalyst may have efficient photocatalytic activity.

The first metal oxide may include at least one of copper, platinum, gold, silver, zinc, manganese, or a combination thereof. Thus, the first metal oxide may include one or more different metals and may be a metal alloy oxide. For example, the first metal oxide may include at least one of $Cu_2O$, $Pt_2O$, $Au_2O$, $Ag_2O$, $Zn_2O$, $Mn_2O$, or a combination thereof. For example, the first metal oxide may be $Cu_2O$. $Cu_2O$, as a p-type semiconductor catalyst, may induce a highly efficient reduction reaction in the gaseous VOCs. In addition, the recombination of an electron ($e^-$) and hole ($h^+$) pair may be prevented by absorbing electrons generated by light (e.g., by ultraviolet light), and the absorption is the wavelength regions of ultraviolet ray and visible light may be improved due to excellent transfer of electrons at the interface between $Cu_2O$ and the second metal oxide.

An amount of the first metal oxide may be about 0.5 parts by weight to about 10 parts by weight, based on 100 parts by weight of the second metal oxide. For example, the amount of the first metal oxide may be about 0.5 parts by weight to about 9 parts by weight, about 0.5 parts by weight to about 8 parts by weight, about 0.5 parts by weight to about 7 parts by weight, about 0.5 parts by weight to about 6 parts by weight, or about 0.5 parts by weight to about 5 parts by weight, based on 100 parts by weight of the second metal oxide. For example, the amount of the first metal oxide may be about 0.5 parts by weight to about 3 parts by weight, based on 100 parts by weight of the second metal oxide. When the amount of the first metal oxide is within the ranges above, the absorbance in the wavelength region between 200 nm and 600 nm may be further improved, the photocurrent density and charge carrier density of the photocatalyst may be increased, and the charge transfer may be easily achieved by lowering the impedance. As a result, the photocatalyst according to one or more embodiments may increase the decomposition and removal efficiency of the gaseous VOCs, and also increase the removal reaction rate.

The second metal oxide may include at least one of titanium, zinc, zirconium, tantalum, tungsten, or a combination thereof. For example, the second metal oxide may include at least one of $TiO_2$, $ZnO$, $ZrO_2$, $Ta_2O_5$, $WO_3$, or a combination thereof. For example, the second metal oxide may be $TiO_2$.

The first metal oxide and the second metal oxide each may be independently in the form of particles, wires, clusters, crystals, or a combination thereof. For example, the first metal oxide and the second metal oxide may each independently be a particle or a crystal. Such a particle shape or a crystal shape may each independently have a spherical shape, a tube shape, a rod shape, a fiber shape, a sheet shape, or a combination thereof, and may have the same or different shapes to control the light absorption efficiency of the photocatalyst.

In the photocatalyst according to one or more embodiments, the first metal oxide particles may be disposed in the form of an island on a surface of the second metal oxide particles, or may have a shape surrounding the second metal oxide particles.

In one or more embodiments, the first metal oxide may be nano-sized primary particles, and the second metal oxide may be micro-sized primary particles, or secondary particles each comprised of a plurality of micro-sized primary particles. For example, the average particle diameter of the first metal oxide particles may be about 5 nm to about 10 nm. When the average particle diameter of the first metal particles is within the ranges above, the first metal oxide particles may be easily disposed on the surface of the second metal oxide particles, and accordingly, the photocatalyst having improved photocatalytic activity may be obtained. For example, the average particle diameter of the primary particles of the second metal oxide may be about 0.1 nm to about 20 nm, for example, about 1 nm to about 10 nm, and for example, about 3 nm to about 7 nm. The average particle diameter of the secondary particles in which the primary particles of the second metal oxide are aggregated may be about 10 nm to about 200 nm, for example, about 30 nm to about 150 nm, and for example, about 50 nm to about 100 nm. Within the ranges above, the second metal oxide particles may obtain a specific surface area of a desired level.

The specific surface area of the primary particles and/or secondary particles of the second metal oxide may be greater than or equal to 100 square meters per gram ($m^2/g$). For example, the specific surface area of the primary particles or secondary particles of the second metal oxide may be about 100 $m^2/g$ to about 500 $m^2/g$, for example, about 100 $m^2/g$ to about 450 $m^2/g$, for example, about 100 $m^2/g$ to about 400 $m^2/g$, for example, about 100 $m^2/g$ to about 350 $m^2/g$, for example, about 100 $m^2/g$ to about 300 $m^2/g$, for example, about 100 $m^2/g$ to about 250 $m^2/g$, or for example, about 100 $m^2/g$ to about 230 $m^2/g$. When the specific surface area of the primary particles or secondary particles of the second metal oxide are within the ranges above, the adsorption area of the gaseous VOCs may be increased, and thus the decomposition and removal efficiency of the gaseous VOCs may increase.

When irradiated with ultraviolet light having a wavelength of about 360 nm to about 365 nm, the photocatalyst according to one or more embodiments may have average photocurrent density of greater than or equal to about 20 microamperes per square centimeter ($\mu A/cm^2$) at 0.5 Volts (V) versus Ag/AgCl potential. For example, the average photocurrent density may be about 20 $\mu A/cm^2$ to about 50 $\mu A/cm^2$, for example, about 20 $\mu A/cm^2$ to about 30 $\mu A/cm^2$.

When applied at a potential in a range of about −0.5 V to about 2.0 V (vs. Ag/AgCl) under irradiation of ultraviolet light having a wavelength of about 360 nm to about 365 nm, the photocatalyst according to one or more embodiments may have charge carrier density of greater than or equal to about $3.0 \times 10^{20}/cm^3$ according to Equation 1. For example, the charge carrier density according to Equation 1 may be about $3.0 \times 10^{20}/cm^3$ to about $4.0 \times 10^{20}/cm^3$:

$$\frac{1}{C_{sc}^2} = \left(\frac{2}{e\varepsilon_0\varepsilon N_D}\right)\left[(E_S - E_{FB}) - \frac{kT}{e}\right] \quad \text{Equation 1}$$

wherein, in Equation 1, No denotes charge carrier density ($cm^{-3}$), $C_{sc}$ denotes space charge capacity (F $cm^{-2}$),
e denotes elementary charge,
ε denotes a non-dielectric constant of an electrode material,
$\varepsilon_0$ denotes vacuum permittivity,
$E_s$ denotes applied potential (V),
$E_{FB}$ denotes flat band potential (V),
k denotes a Boltzmann constant ($1.38 \times 10^{-23}$ J $K^{-1}$), and
T denotes an absolute temperature (K).

Figure 6:
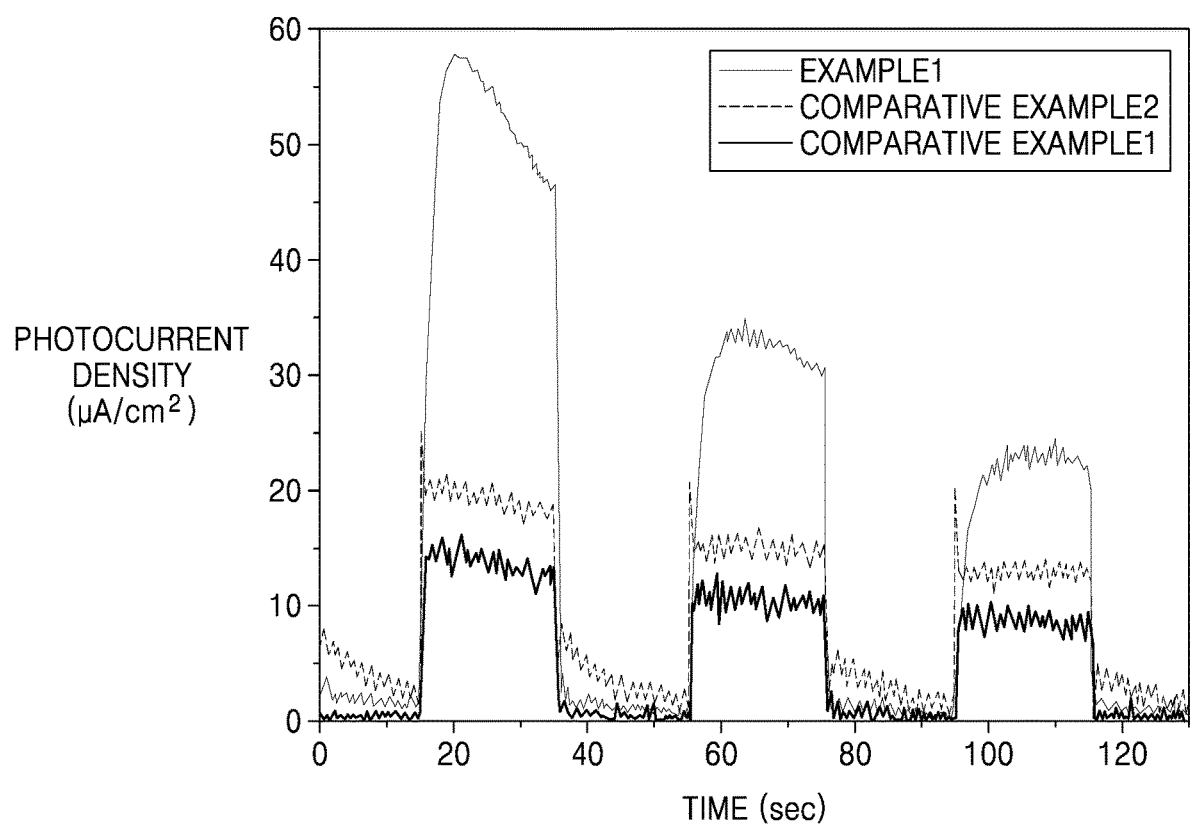
FIG. 6 is a graph of photocurrent density (microamperes per square centimeter, $\mu A/cm^2$) versus time (seconds, sec) and shows results of measuring photocurrent density over time depending on irradiation of ultraviolet ray (e.g., UVA) to $Cu_2O/TiO_2$, $TiO_2$, and $CuO/TiO_2$ photocatalysts prepared according to Example 1 and Comparative Examples 1 and 2.
Figure 7:
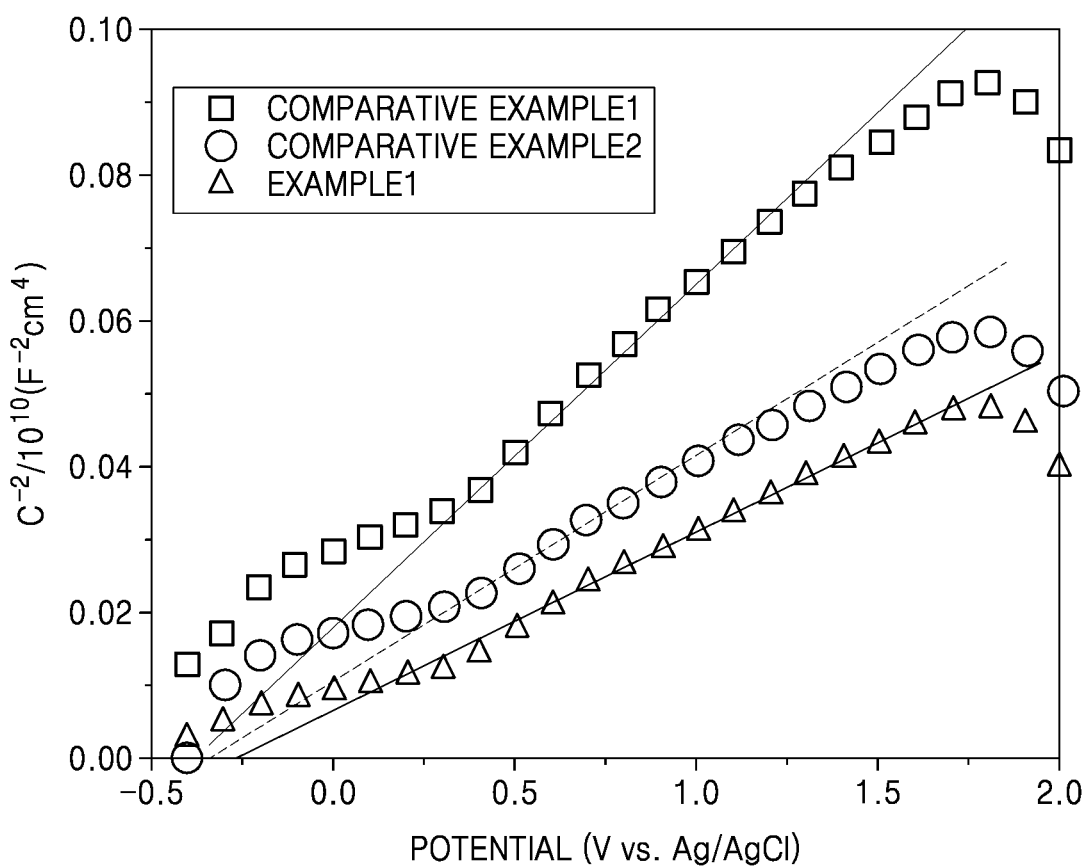
FIG. 7 is a graph of charge density per volume (as defined by Equation 1 herein) versus potential (V vs. Ag/AgCl) and shows results of measuring charge density per volume when a potential in a range of about −0.5 V to about 2.0 V (vs. Ag/AgCl) is applied under irradiation of ultraviolet rays (e.g., UVA) to $Cu_2O/TiO_2$, $TiO_2$, and $CuO/TiO_2$ photocatalysts prepared according to Example 1 and Comparative Examples 1 and 2.

The average photocurrent density and charge carrier density may be confirmed by Evaluation Example 1 and FIGS. 6 and 7 to be described herein.

The photocatalyst may be used for decomposition and removal of the gaseous VOCs. The photocatalyst may not generate ozone. In other words, the photocatalyst may substantially decompose and/or substantially remove one or more of the gaseous VOCs.

In the photocatalyst according to one or more embodiments, a decomposition efficiency for a gaseous VOC may be greater than or equal to about 85% according to Equation 2, when measured at 23° C. and a relative humidity of 0%, and a decomposition efficiency for a gaseous VOC may be greater than or equal to about 90% according to Equation 2, when measured at 23° C. and a relative humidity of 50%:

$$\text{decomposition efficiency (\%)} = \{(\text{concentration of converted } CO_2)/(\text{initial concentration of gaseous VOC}) \times 100\%\}. \quad (2)$$

This may be confirmed by Evaluation Example 3 and FIGS. 15 and 16 to be described hereinbelow.

The photocatalyst according to one or more embodiments may be prepared by the following method.

The method may include obtaining a first resultant product by performing first heat treatment on a mixture including a precursor of the first metal oxide and a precursor of the second metal oxide; and obtaining a second resultant product by adding glucose and sodium hydroxide to the first resultant product and performing a second heat treatment thereon.

An amount of the precursor of the first metal oxide may be about 0.5 parts by weight to about 10 parts by weight, based on 100 parts by weight of the second metal oxide. For example, based on 1 mole of copper immersed in the first resultant product, the amount of glucose to be added may be about 2 moles to about 6 moles, and the amount of sodium hydroxide to be added may be about 2 moles to about 16 moles. The first heat treatment and the second heat treatment may be performed by a double boiling treatment. By impregnation through a double boiling treatment, a catalyst may be well synthesized.

According to another aspect, a catalyst filter may include a porous ceramic support; and the photocatalyst disposed on the surface of the porous ceramic support.

Figure 9:
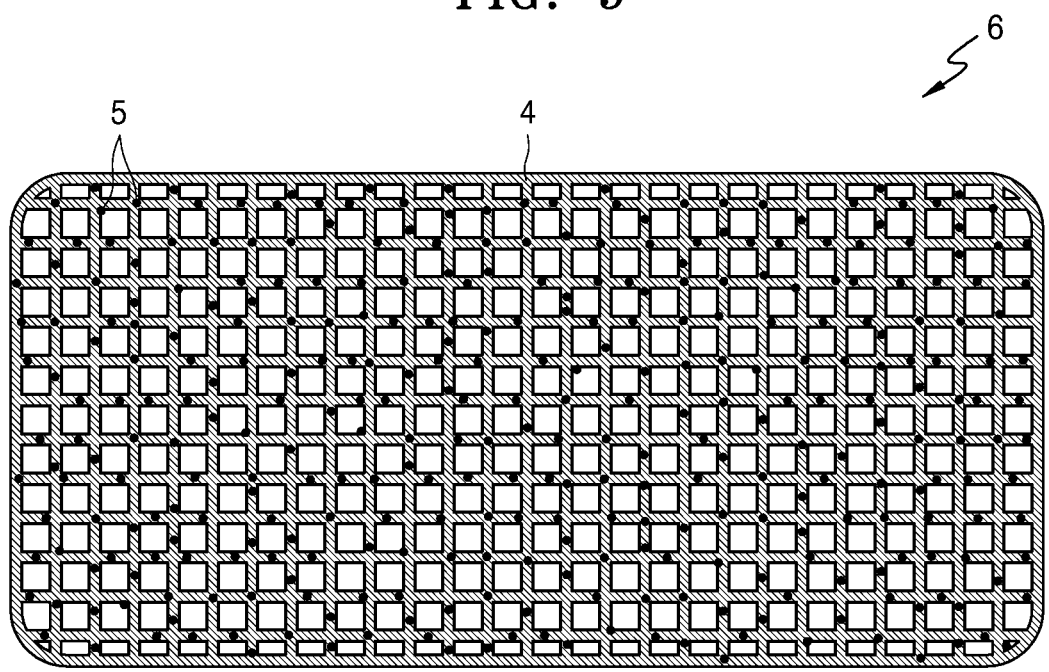
FIG. 9 is a schematic view of a catalyst filter according to one or more embodiments.

FIG. 9 is a schematic view of a catalyst filter 6 according to one or more embodiments.

Referring to FIG. 9, the catalyst filter 6 includes a porous ceramic support 4 and particles or particle aggregates 5 of a photocatalyst, wherein the particles or particle aggregates 5 are coated on the surface of the porous ceramic support 4. The porous ceramic support 4 may have a high strength and a high specific surface area, thereby increasing the activity of the photocatalyst. In addition, the porous ceramic support 4 may maintain the shape thereof even under external environments such as a strong acid, high temperatures, and strong forces such as wind, and may reduce pressure loss due to excellent air permeability.

The porous ceramic support 4 may have a honeycomb structure. The cross section thereof may have various shapes, such as a circle, an oval, a rectangle, a square, or the like. The porous ceramic support 4 may have a cylindrical shape, a cuboid shape, or a cube shape, each having a height and a diameter of several millimeters (mm) or several tens of millimeters (mm), but embodiments are not limited thereto.

For example, the porous ceramic support 4 may have a honeycomb structure having about several hundred square cells per inch. Through the square cells of the porous ceramic support 4, air containing the gaseous VOCs may flow in. For example, the square cells may have a size of several hundred cells per square inch (cpsi), but embodiments are not limited thereto.

The porous ceramic support 4 may include magnesium oxide, silicon oxide, and/or aluminum oxide, in an amount of greater than or equal to about 50%. The porous ceramic support 4 may further include an alkali oxide substance. Examples of the alkali oxide substance include $Li_2O$, $Na_2O$, $K_2O$, or the like, or a combination thereof. The porous ceramic support 4 further including the alkali oxide substance may maintain the shape of the catalyst filter 6 without thermal deformation even at a high temperature. The porous ceramic support 4 may be a single laminate, a multi-layered laminate, or a single structure.

The catalyst module according to another embodiment may includes the catalyst filter; and an energy supply source, wherein the energy supply source supplies energy to the catalyst filter for catalyst activation. For example, the energy supply source may be disposed on the catalyst filter for activation of the catalyst.

The energy supply source may include at least one of a light energy supply source, an electric energy supply source, an ion energy supply source, a heat energy supply source, or a combination thereof. The light energy supply source may supply light energy in a visible light wavelength region to an ultraviolet wavelength region. The ion energy supply source may supply plasma. The heat energy supply source may supply infrared energy as heat energy. The energy supply source may include an ultraviolet light emitting diode (UV-LED). For example, the UV-LED may be an ultraviolet A (UVA) LED (UVA-LED), an ultraviolet B (UVB) LED (UVB-LED), an ultraviolet C (UVC) LED (UVC-LED), or a combination thereof.

Figure 10A:
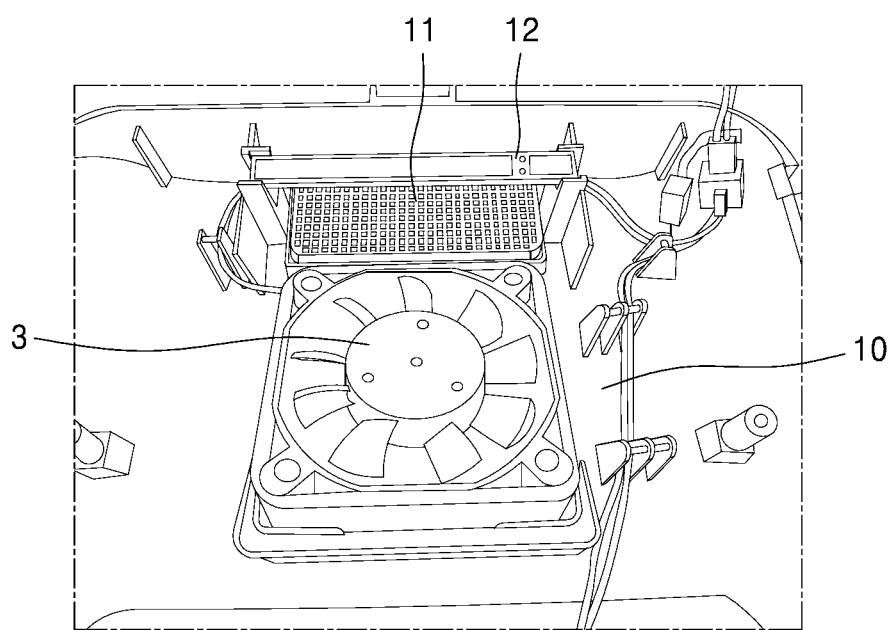
FIG. 10A is a schematic view of a catalyst module according to one or more embodiments.

FIG. 10A is a schematic view of a catalyst module 10 according to one or more embodiments.

Referring to FIG. 10A, the catalyst module 10 includes: a catalyst filter 11 in which particles or particle aggregates of a photocatalyst are coated on the surface of the support; and a light emitter 12 for irradiating light to the catalyst filter 11 for activation of the catalyst. The light emitter 12 may include a light source array including a single light source or a plurality of light sources. The light emitter 12 may include a substrate, a light-emitting device provided on the substrate, and a capsule sealing and protecting the light-emitting device. The light-emitting device may be a UV-LED, or may include a UV-LED. The substrate may include a control unit, for example, a circuit unit, for controlling operation of the light-emitting device. The capsule may be formed on the substrate, and may be provided to cover the entire light-emitting device on the substrate. The capsule may be formed of a material that is transparent to light emitted from the light-emitting device. The catalyst module 10 may further include a circulation fan 3 disposed toward the opposite surface of the catalyst filter 11 on which the light emitter 12 is disposed. The light emitter 12 and the circulation fan 3 may be connected to a power source (not shown). When the catalyst module 10 operates, the light emitter 12 emits light on a surface of the catalyst filter 11 facing the light emitter 12, and the catalyst filter 11 absorbs the emitted light to form an activated photocatalyst layer on the surface. The activated catalyst layer may decompose and remove the VOCs by an oxidation/reduction reaction as described with reference to FIG. 1A.

Figure 10B:
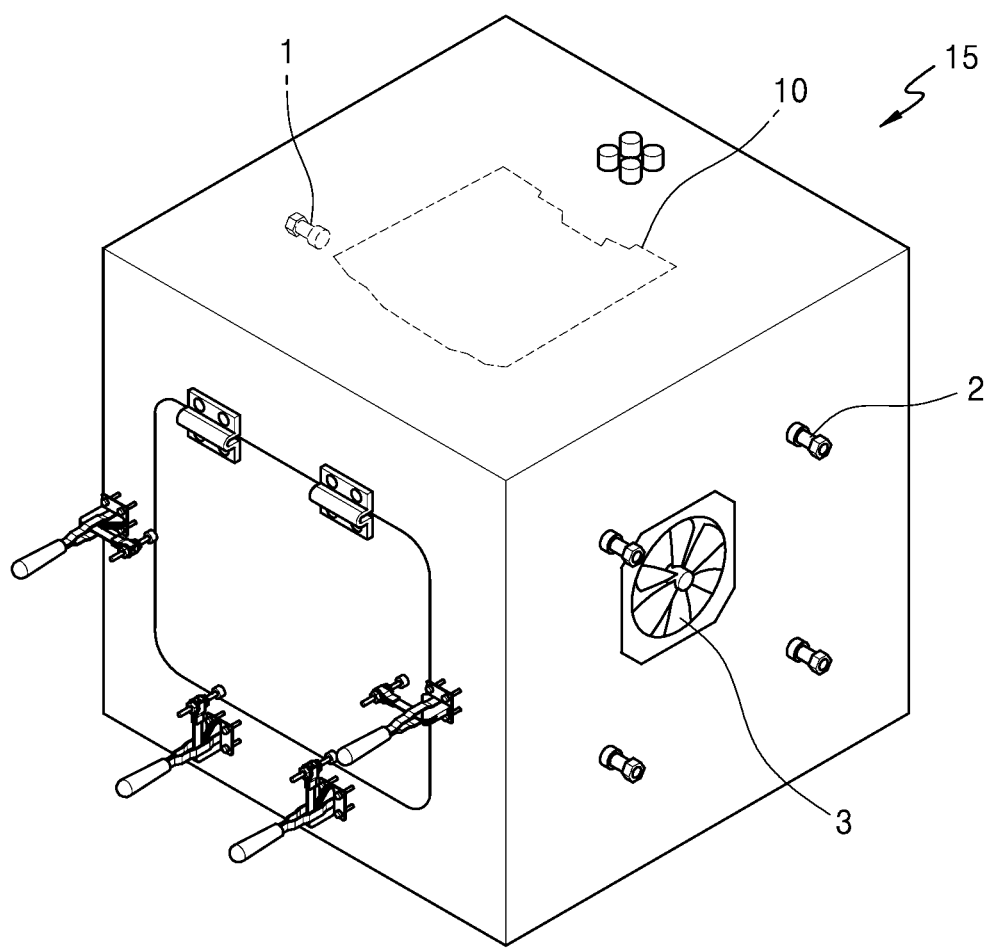
FIG. 10B is a schematic view of a chamber in which the catalyst module of FIG. 10A is mounted.

FIG. 10B is a schematic view of a chamber in which the catalyst module of FIG. 10A may be mounted. FIG. 10B shows a chamber in which the catalyst module 10 may be mounted, wherein a gas inlet 1 and a gas outlet 2 are installed on one side and the other side parallel to the one side, respectively, and the circulation fan 3 is located on the other side where the gas outlet 2 is installed.

Figure 11:
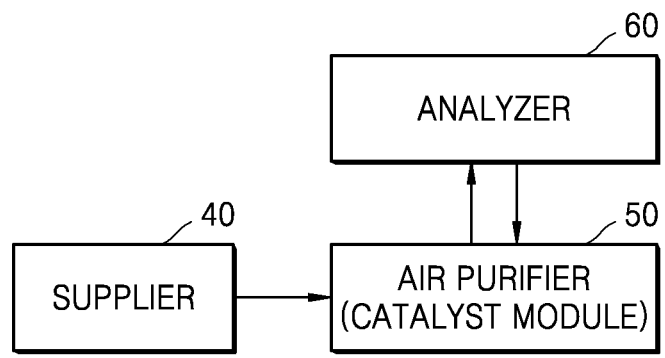
FIG. 11 is a schematic view of an air purification system according to one or more embodiments.

FIG. 11 is a schematic view of an air purification system according to one or more embodiments.

Referring to FIG. 11, the air purification system includes a supplier 40 for supplying air containing one or more gaseous VOCs; and an air purifier 50 equipped with the catalyst module that substantially decomposes and substantially removes the one or more VOCs from the air supplied from the supplier 40, and discharges a purified air from which the one or more gaseous VOCs are substantially decomposed and substantially removed. The air purification system may further include an analyzer 60 for identifying the one or more gaseous VOCs and a concentration of the one or more gaseous VOCs present in the air purifier 50. For circulation, the analyzer 60 may be connected to the air purifier 50. The air purifier 50 may correspond to the chamber of FIG. 10B. In some aspects, the air purification system may further include an analyzer 60 for identifying the at least one gaseous VOC and a concentration of the at least one gaseous VOCs present in the air purifier 50.

The supplier 40 may include a first supplier for directly supplying air containing VOCs; and a second supplier for supplying the gaseous VOCs by mixing and vaporizing a carrier gas and a process gas The gaseous VOC may include at least one of gaseous formaldehyde, gaseous ammonia, gaseous acetaldehyde, gaseous acetic acid, gaseous toluene, or a combination thereof.

The first supplier may include a gas supply unit for supplying gas having a constant concentration; and a control unit for detecting a gas flow discharged from the gas supply unit and adjusting an amount of the gas. The gas supplied by the first supplier may be gaseous ammonia, gaseous acetaldehyde, gaseous acetic acid, gaseous toluene, or a combination thereof.

The second supplier will be described in further detail below.

Figure 12:
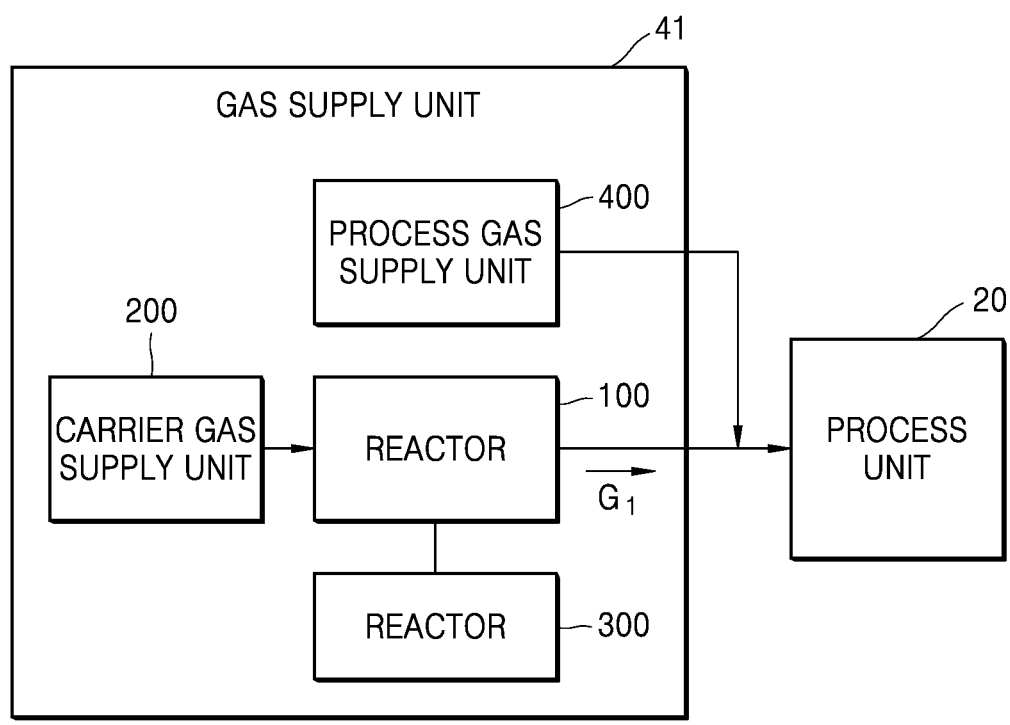
FIG. 12 is a schematic view of a gas supply unit of a second supplier which is an example of the supplier of FIG. 11.

FIG. 12 is a schematic view of a gas supply unit of a second supplier 41 which is an example of the supplier of FIG. 11.

Referring to FIG. 12, the second supplier 41 includes a gas supply unit 41 for supplying reaction gas $G_1$ having a constant concentration; and a process unit 20 for performing a predetermined process by using the reaction gas $G_1$ supplied from the gas supply unit 41. In one or more embodiments, the gas supply unit 41 may supply solid-type reaction gas $G_1$ by using a solid-type reactant M.

The process unit 20 may be an any apparatus capable of performing physical and chemical processes by receiving the reaction gas $G_1$ from the gas supply unit 41. In one or more embodiments, the process unit 20 may be used in a production apparatus that receives the reaction gas $G_1$ having a constant concentration to perform a semiconductor production process or a display production process, such as an etching process or a deposition process. In addition, the process unit 20 may be used in an experimental apparatus which receives the reaction gas $G_1$ having a constant concentration to confirm the degree of removal of pollutants, such as removal of pollutants. However, the embodiments are not limited thereto, and the process unit 20 may be applied to any apparatus capable of performing a subsequent process after receiving the reaction gas $G_1$ having a constant concentration.

To continuously supply the gas-type reaction gas $G_1$ having a constant concentration to the process unit 20 as described above, the gas supply unit may accommodate the gas-type reactive gas $G_1$ having a constant concentration. In this case, since the form of the reaction gas $G_1$ accommodated in the gas supply unit is a gas type, the volume of the gas supply unit 10 may be rapidly increased. Since the reactant M accommodated in the gas supply unit 41 according to one or more embodiments is in a solid form, the total volume of the gas supply unit 41 may be reduced. Meanwhile, the concentration of the reaction gas $G_1$ discharged from the gas supply unit 41 in the process of converting the solid-type reactant M into the gas-type reaction gas $G_1$ may not be constant. To convert the solid-type reactant M into the gas-type reaction gas $G_1$ and to maintain the constant concentration of the reaction gas $G_1$ discharged from the gas supply unit 10, the gas supply unit of FIG. 13 may be utilized.

Figure 13:
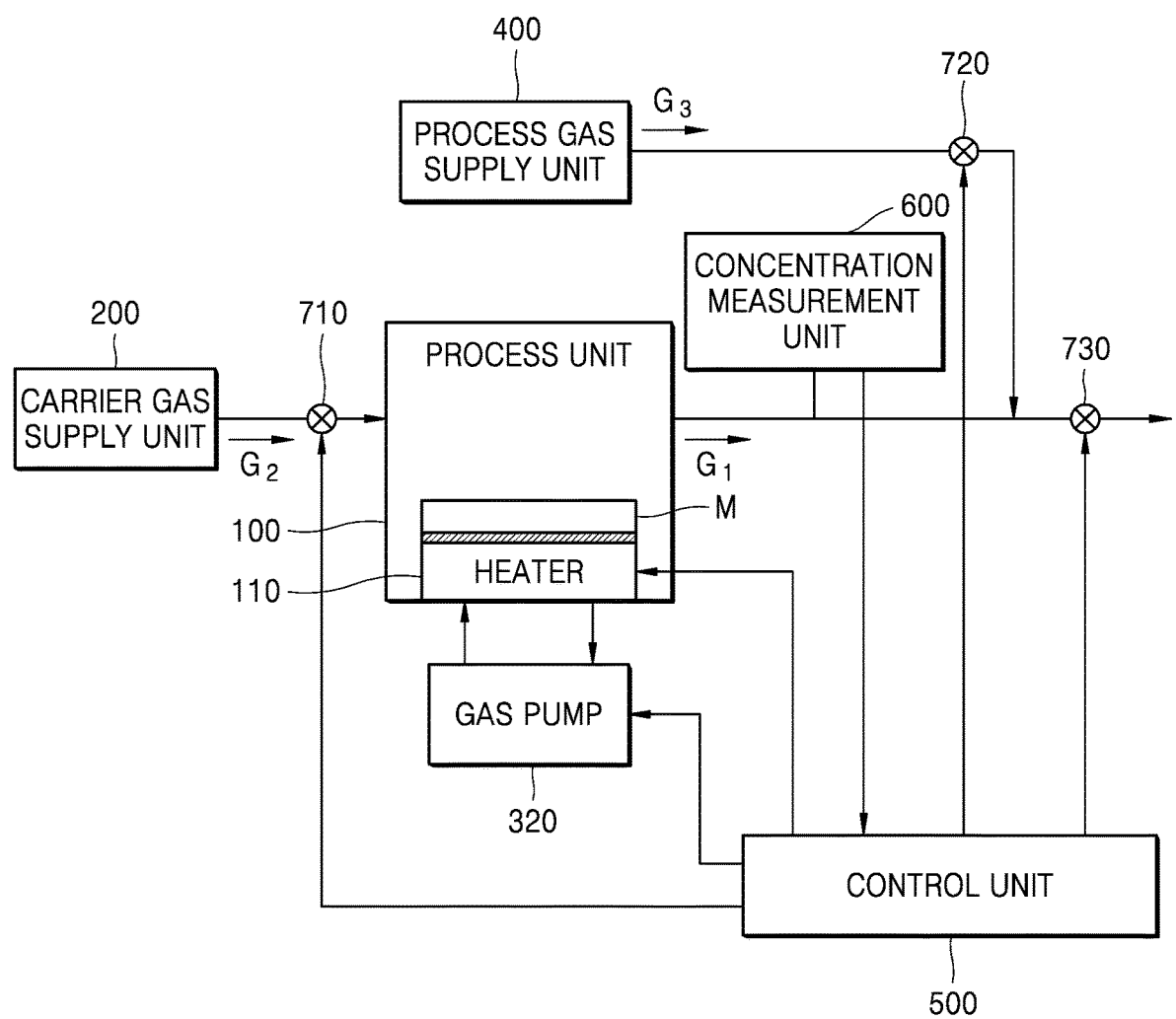
FIG. 13 is a schematic view of the gas supply unit of FIG. 11.
Figure 14:
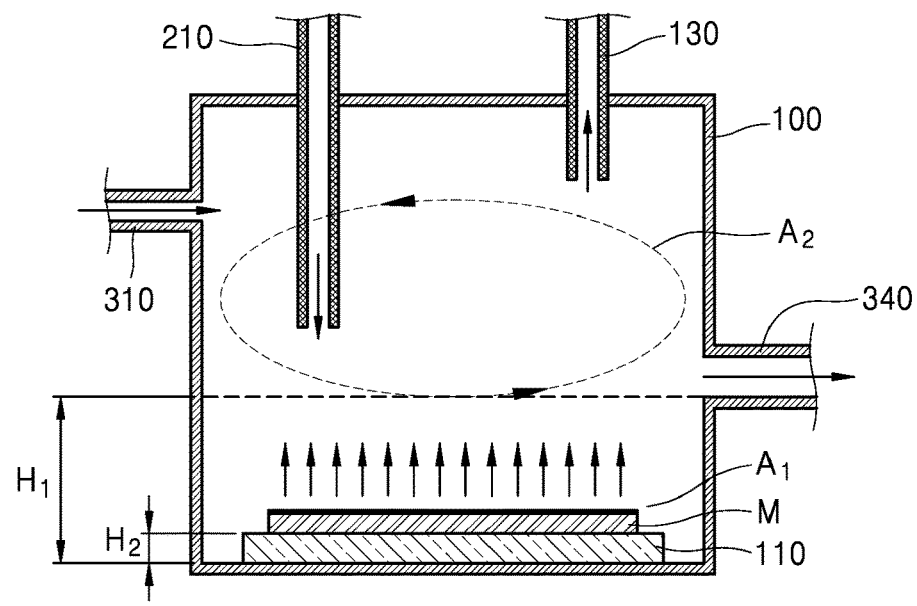
FIG. 14 is a schematic view of a reactor included in the gas supply unit of FIG. 11.

Referring to FIGS. 13 and 14, the gas supply unit according to one or more embodiments includes: a reactor 100 accommodating a reactant M in a solid form; a heater 110 for applying heat to the reactant M; a gas discharging unit 340 for discharging reaction gas $G_1$ to a process unit; a carrier gas supply unit 200; a gas pump 320 for applying a predetermined pumping pressure to the reactor 100; a process gas supply unit 400; a control unit 500; and a concentration measurement unit 600.

The reactor 100 may be an accommodating unit that accommodates the reactant M and provides a space for generating reaction gas G1 in gas form by using the reactant M in solid form. In one or more embodiments, the reactant M in solid form accommodated in the reactor 100 may be any material capable of being vaporized by heat supplied from the heater 110. The reactant M according to one or more embodiments may be provided in powder form to be easily vaporized. For example, the reactant M may be any one of para(ρ)-formaldehyde in powder form, a solid-phase volatile material, and a liquid-phase volatile material. The gas discharging unit 130 where the reaction gas $G_1$ may be discharged may be disposed on an upper portion of the reactor 100. In addition, on a side surface of the reactor 100, a pumping gas inlet unit 310 and a pumping gas outlet unit 340, which are to be described below, through which pumping gas may flow in or flow out, respectively. However, embodiments are not limited thereto, and the arrangement of the gas discharging unit 130, the pumping gas inlet unit 310, and the pumping gas outlet unit 320 may vary depending on the type of the reaction gas $G_1$ and the pumping gas.

The heater 110 may be a heating source to change the reactant M to the reaction gas $G_1$ by applying heat to the reactant M. In one or more embodiments, the heater 110 may be disposed on a lower portion of the reactor 100, and the reactant M may be disposed on an upper portion of the heater 110. For example, the heater 110 may be a hot plate capable of uniformly applying heat to the reactant M disposed on an upper portion of the heater 110. However, embodiments are not limited thereto, and any heating apparatus capable of applying heat to the reactant M may be disposed. The heating of the heater 110 according to one or more embodiments may be controlled by the control unit 500 to be described below.

The carrier gas supply unit 200 may supply the carrier gas $G_2$ for transferring the reaction gas $G_1$ discharged from the reactor 100 to the process unit. The carrier gas $G_2$ according to one or more embodiments may include inert gas that does not chemically react with the reaction gas $G_1$. For example, the carrier gas $G_2$ may include one or more of nitrogen, oxygen, air, or a combination thereof. As shown in FIG. 14, a carrier gas inlet unit 210 through which the carrier gas $G_2$ may flow in may be disposed on an upper portion of the reactor 100. A first opening/closing valve 710 for blocking and releasing the supply of the carrier gas $G_2$ may be disposed between the carrier gas supply unit 200 and the carrier gas inlet unit 210. The opening and closing of the first opening/closing valve 710 may be controlled by the control unit 500 to be described below. For example, when heat is applied to the reactant M by using the heater 110, the first opening/closing valve 710 may be controlled to be closed until the concentration of the reaction gas G1 exceeds a predetermined target concentration. After the concentration of the reaction gas G1 exceeds a predetermined target concentration, the first opening/closing valve 710 may be opened. Here, the carrier gas $G_2$ may flow into the reactor 100.

The gas pump 320 may apply a predetermined pumping pressure to the reactor 100. In one or more embodiments, the gas pump 320 may relatively uniformly adjust the concentration of the reaction gas $G_1$ disposed inside the reactor 100 by applying a predetermined pumping pressure to the reactor 100. According to one embodiment, as shown in FIG. 14, the heater 110 is disposed at a lower portion of the reactor 100, and the reactant M in solid form may receive heat from the heater 110. Accordingly, the concentration of the reaction gas $G_1$ sensed in a lower portion of the reactor 100 may be higher than the concentration of the reaction gas $G_1$ sensed in an upper portion of the reactor 100. Here, the concentration of the reaction gas $G_1$ discharged through the gas discharging unit 130 may not be constant.

The gas pump 320 according to one or more embodiments may circulate the reaction gas $G_1$ by applying a pumping pressure to the upper portion of the reactor 100. Here, in the upper portion where the reaction gas $G_1$ circulates, the concentration of the reaction gas $G_1$ may be relatively uniform. For example, the interior of the reactor 100 may be divided into an area $A_1$ with a non-uniform concentration of the reaction gas and an area $A_2$ with a uniform concentration of the reaction gas.

In one or more embodiments, as shown in FIG. 14, on the reactor 100, the pumping gas inlet unit 310 where the pumping gas supplied from the gas pump 320 flows in and the pumping gas outlet unit 340 pumping gas where the pumping gas flows out may be disposed. Here, the pumping gas outlet unit 340 may be disposed at a first height $H_1$ from the lower surface of the reactor 100, and the heater 110 may be disposed at a second height $H_2$ from the lower surface of the reactor 100, wherein the first height $H_1$ may be disposed to exceed the second height $H_2$. Accordingly, in the area up to the first height $H_1$ at which the pumping gas outlet unit 340 is disposed, the area $A_1$ with a non-uniform concentration of the reaction gas may be formed. That is, in the area $A_1$ with a non-uniform concentration of the reaction gas, the reactant M in solid form may be converted to the reaction gas $G_1$ by receiving heat, and thus the concentration of the reaction gas $G_1$ may vary depending on the position. Meanwhile, in the area exceeding the first height $H_1$ at which the pumping gas outlet unit 340 is disposed, the area $A_2$ with a uniform concentration of the reaction gas may be formed. That is, in the area $A_1$ with a non-uniform concentration of the reaction gas, the reaction gas $G_1$ may circulate by a pumping pressure applied by the gas pump 320 so that the concentration of the reaction gas $G_1$ may be maintained relatively uniform according to the position. Therefore, the reaction gas $G_1$ having a constant concentration may be discharged through the gas discharging unit 130 disposed in the area $A_2$ with a uniform concentration of the reaction gas.

In addition, referring to FIG. 13, according to one or more embodiments, the pumping pressure of the gas pump 320 may be controlled by the control unit 500. In one or more embodiments, the control unit 500 may adjust the pumping pressure according to a change in the concentration of the reaction gas $G_1$ after receiving the confirmed concentration of the reaction gas $G_1$ from the concentration measurement unit 600 which will be described below. For example, when the concentration of the reaction gas $G_1$ discharged from the reactor 100 changes, the control unit 500 increases the pumping pressure to increase the circulation of the reaction gas $G_1$, thereby adjusting the concentration of the reaction gas $G_1$ constantly.

The process gas supply unit 400 may additionally supply process gas $G_3$ that is mixed with the reaction gas $G_1$ discharged from the reactor 100. The process gas $G_3$ according to one or more embodiments may include inert gas that does not chemically react with the reaction gas $G_1$ or any other process gas that is used in the process unit 20. For example, the carrier gas $G_2$ may include one or more of nitrogen, oxygen, air, or a combination thereof. The process gas $G_3$ may be arranged to be mixed with the reaction gas $G_1$ outside the reactor 100. A second opening/closing valve 720 for blocking and releasing the supply of the process gas $G_3$ may be disposed with the process gas supply unit 400. The opening/closing of the second opening/closing valve 720 according to one or more embodiments may be controlled by the control unit 500 which will be described below.

The control unit 500 is a control apparatus that controls the operation of the heater 110 and the gas pump 320 and is capable of controlling the time for blocking and releasing of the first to third opening/closing valves 710, 720, and 730. In one or more embodiments, the control unit 500 may include a user interface including a processor for controlling the overall functions and operations of the gas supply unit 41, a program for the operation of the gas supply unit 41, a memory in which data required for the operation is stored, and an input unit and an output unit.

The concentration measurement unit 600 is a measuring apparatus capable of delivering the concentration information of the reaction gas $G_1$ to the control unit 500 after measuring the concentration of the reaction gas $G_1$ discharged from the reactor 100. Here, the concentration information of the reaction gas $G_1$ refers to concentration information of the reaction gas $G_1$ in the form of gas vaporized from the reactant M among all the gases passing through the gas discharging unit 130. Any measuring apparatus capable of measuring the concentration of the reaction gas $G_1$ in gas form may be used for the concentration measurement unit 600.

A method of operating the second supplier including the gas supply unit according to one or more embodiments is as follows.

According to one or more embodiments, the reactant M including at least one of a solid-type volatile material and a liquid-type volatile material may be disposed inside the reactor 100. For example, the heater 110 may be disposed below the reactor 100, and the reactant M may be disposed above the heater 110. The reactant M in solid form disposed in the reactor 100 may be any material capable of being vaporized by receiving heat from the heater 110. The reactant M according to one or more embodiments may be provided in powder form to be easily vaporized. For example, the reactant M may be ρ-form aldehyde in powder form.

Next, heat may be applied to the reactant M to generate reaction gas $G_1$. For example, when heat is applied to the reactant M in solid form by using the heater 110, the reactant M in solid form may be vaporized to generate reaction gas $G_1$ in gas form. Here, the interior of the reactor 100 may be sealed until the concentration of the reaction gas $G_1$ exceeds a target concentration. For example, all the first opening/closing valve 710 connected to the carrier gas supply unit 200, the second opening/closing valve 720 connected to the process gas supply unit 400, and the third opening/closing valve 730 connected to the process unit 20 may be controlled by the control unit 500 to be blocked.

Next, carrier gas $G_2$ may be supplied into the reactor 100. For example, when the concentration of the reaction gas $G_1$ exceeds a target concentration, the carrier gas $G_2$ may be supplied into the reactor 100. In one or more embodiments, the blocking of the first opening/closing valve 710 connected to the carrier gas supply unit 200 may be opened by the control unit 500, and accordingly, the carrier gas $G_2$ may be supplied into the reactor 100. The carrier gas $G_2$ according to one or more embodiments may include inert gas that does not chemically react with the reaction gas $G_1$. For example, the carrier gas $G_2$ may include one or more of nitrogen, oxygen, and air.

Next, a pumping pressure may be applied into the reactor 100 by operating the gas pump 320. In one or more embodiments, the heater 110 may be disposed below the reactor 100, and the reactant M in solid form may receive heat from the heater 110. Accordingly, the concentration of the reaction gas $G_1$ sensed in a lower portion of the reactor 100 may be higher than the concentration of the reaction gas $G_1$ sensed in an upper portion of the reactor 100. Here, the concentration of the reaction gas $G_1$ discharged through the gas discharging unit 130 may not be constant. The gas pump 320 according to one or more embodiments may circulate the reaction gas $G_1$ by applying a pumping pressure to the upper portion of the reactor 100. Accordingly, in the upper portion where the reaction gas $G_1$ circulates, the concentration of the reaction gas $G_1$ may be controlled relatively constant.

Next, the concentration of the reaction gas $G_1$ may be measured. In one or more embodiments, the concentration measurement unit 600 may measure the concentration of the reaction gas $G_1$ discharged from the reactor 100. Here, a target concentration measured by the concentration measurement unit 600 is a concentration of reaction gas $G_1$ that is generated by vaporizing the reactant M. When the concentration of the reaction gas $G_1$ is maintained substantially equal to the target concentration, the concentration measurement unit 600 may deliver the concentration information of the reaction gas $G_1$ to the control unit 500. Here, the control unit 500 may transmit a control signal to the gas pump 320 to maintain the pumping pressure of the gas pump 320 constantly. In addition, the reaction gas $G_1$ discharged from the reactor 100 may be transferred to the process unit 20.

Next, the pumping pressure may be adjusted according to a change in the concentration of the reaction gas $G_1$. In one or more embodiments, when the concentration of the reaction gas $G_1$ discharged from the reactor 100 changes to be different from the target concentration, the concentration measurement unit 600 may deliver the concentration information of the reaction gas $G_1$ to the control unit 500. Here, the control unit 500 may transmit a control signal to the gas pump 320 to maintain the pumping pressure of the gas pump 320 constantly. For example, when the concentration of the reaction gas $G_1$ is not constant, the control unit 500 may control the gas pump 320 to increase the pumping pressure of the gas pump 320.

Next, the process gas $G_3$ may be supplied. In one or more embodiments, process gas $G_3$ that is mixed with the reaction gas $G_1$ discharged from the reactor 100 may be additionally supplied. The process gas $G_3$ according to one or more embodiments may include inert gas that does not chemically react with the reaction gas $G_1$ or any other process gas that is used in the process unit 20. For example, the carrier gas $G_2$ may include one or more of nitrogen, oxygen, air, or a combination thereof. The second opening/closing valve 720 for blocking and releasing the supply of the process gas $G_3$ may be disposed in the process gas supply unit 400. Depending on the need of the process gas $G_3$, the control unit 500 may control the opening/closing of the second opening/closing valve 720.

Next, the reaction gas $G_1$ may be transferred to the process unit 20. In one or more embodiments, the reaction gas $G_1$ having a constant concentration may be transferred to the process unit 20. Accordingly, the process unit 20 may perform a predetermined process by using the reaction gas $G_1$.

Examples of the analyzer 60 include an IR analyzer, a light spectrometer, or the like.

Regarding the air purification system according to one or more embodiments, the removal efficiency of the gaseous formaldehyde, the gaseous ammonia, the gaseous acetaldehyde, the gaseous acetic acid, and the gaseous toluene may be greater than or equal to about 80% according to Equation 3, when measured at 23° C. and a relative humidity of 45±5%. For example, the removal efficiency for at least one of the gaseous formaldehyde, the gaseous ammonia, the gaseous acetaldehyde, the gaseous acetic acid, and the gaseous toluene may be greater than or equal to about 80% according to Equation 3, when measured at 23° C. and a relative humidity of 45±5%. In some embodiments, the removal efficiency for each of the gaseous formaldehyde, the gaseous ammonia, the gaseous acetaldehyde, the gaseous acetic acid, and the gaseous toluene each may be greater than or equal to about 80% according to Equation 3, when measured at 23° C. and a relative humidity of 45±5%. This may be confirmed by Evaluation Example 4 which will be described hereinbelow.

Hereinafter, Examples and Comparative Examples will be described in further detail. However, the Examples are merely for illustrative purposes and are not intended to limit the scope of the present subject matter.

EXAMPLES

Example 1

$Cu_2O/TiO_2$ Photocatalyst

By using an impregnation method, a $Cu_2O/TiO_2$ photocatalyst was synthesized as follows.

First, based on 100 parts by weight of $TiO_2$ (ST-01, ISHIHARA SANGYO KAISHA, LTD.), 0.5 parts by weight of $CuCl_2$ was mixed with $TiO_2$ and double bath treatment was performed thereon at 90° C. for 1 hour to obtain a $CuO/TiO_2$-containing solution.

Glucose and NaOH were added to the $CuO/TiO_2$-containing solution at a molar ratio (mol %) of 1:4:4, and double bath treatment was performed thereon at 90° C. for 1 hour to obtain a $Cu_2O/TiO_2$-containing solution.

The $Cu_2O/TiO_2$-containing solution was dried in an oven at 110° C. overnight, and the dried product was ground with a mortar to prepare a $Cu_2O/TiO_2$ photocatalyst.

Examples 2 to 7

$Cu_2O/TiO_2$ Photocatalyst $Cu_2O/TiO_2$ photocatalysts were each prepared in a similar manner as in Example 1, except that, based on 100 parts by weight of $TiO_2$ (ST-01, ISHIHARA SANGYO KAISHA, LTD.), either 1 part by weight (Example 2), 2 parts by weight (Example 3), 3 parts by weight (Example 4), 4 parts by weight (Example 5), 5 parts by weight (Example 6), or 10 parts by weight (Example 7) of $CuCl_2$ were each mixed to prepare a $Cu_2O/TiO_2$ catalyst.

Comparative Example 1

$TiO_2$ Photocatalyst

A $TiO_2$ (ST-01, ISHIHARA SANGYO KAISHA, LTD.) photocatalyst was prepared.

Comparative Example 2

$CuO/TiO_2$ Photocatalyst

Based on 100 parts by weight of $TiO_2$ (ST-01, ISHIHARA SANGYO KAISHA, LTD.), 0.5 parts by weight of $CuCl_2$ was mixed and double bath treatment was performed thereon at 90° C. for 1 hour to obtain a $CuO/TiO_2$-containing solution.

The $CuO/TiO_2$-containing solution was dried in an oven at 110° C. overnight, and the dried product was ground with a mortar to prepare a $CuO/TiO_2$ photocatalyst.

Comparative Example 3

$CuO/TiO_2$ Photocatalyst

A $CuO/TiO_2$ photocatalyst was prepared in the same manner as in Example 1, except that 100 parts by weight of $TiO_2$ (P25, PlasmaChem GmbH) was used instead of $TiO_2$ (ST-01, ISHIHARA SANGYO KAISHA, LTD.).

Analysis Example 1

XPS Analysis

An XPS test was performed to confirm an oxidation number of copper in the $Cu_2O/TiO_2$ photocatalyst of Example 1. The XPS test was performed by using a Quantum 2000 (Physical Electronics. Inc.). The XPS analysis results are shown in FIG. 2.

Figure 2:
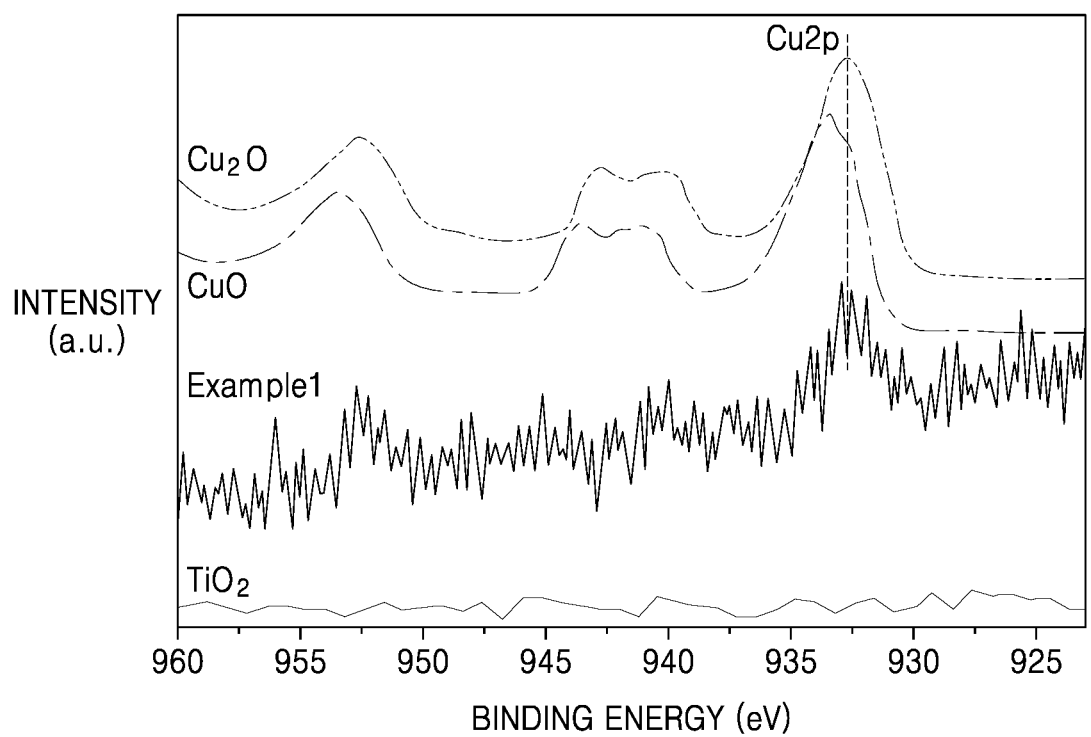
FIG. 2 is a graph of intensity (arbitrary units, a.u.) versus binding energy (electron Volts, eV) showing X-ray photoelectron spectroscopy (XPS) results for a $Cu_2O/TiO_2$ photocatalyst prepared according to Example 1.

Referring to FIG. 2, it was confirmed that the $Cu_2O/TiO_2$ photocatalyst of Example 1 was consistent with a $Cu_2O$ peak indicating a Cu2p peak and having an oxidation number of +1 at binding energy of about 933 eV.

Analysis Example 2

Analysis of Emission Spectrum and UV-Visible Spectrum (Kubelka-Munk-Function)

Figure 3:
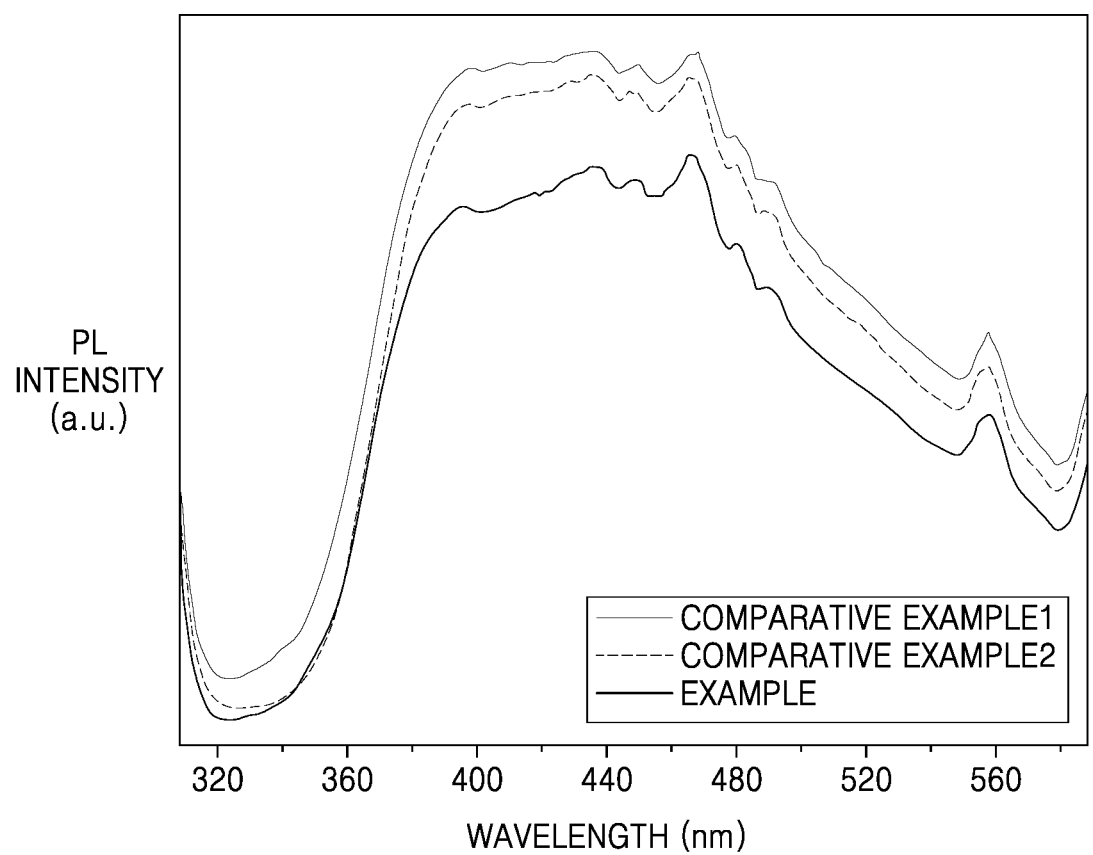
FIG. 3 is a graph of photoluminescence (PL) intensity (a.u.) versus wavelength (nm) and shows emission spectra of $Cu_2O/TiO_2$, $TiO_2$, and $CuO/TiO_2$ photocatalysts prepared according to Example 1 and Comparative Examples 1 and 2.

Emission spectra of the $Cu_2O/TiO_2$, $TiO_2$, and $CuO/TiO_2$ photocatalysts of Example 1 and Comparative Examples 1 and 2 were measured, and UV-visible spectra of the same were measured after press-fixing powders of the $Cu_2O/TiO_2$ and $TiO_2$ photocatalysts of Examples 1 to 7 and Comparative Example 1 onto a holder. The emission spectra and the UV-visible spectra were recorded with a FluoroMax (manufactured by HORIBA Inc.) and UV-2600i (manufactured by SHIMADZU Inc.), respectively. The analysis results of the emission spectra are shown in FIG. 3. The absorbance for each wavelength obtained by the analysis of the UV-visible spectra was substituted into the Kubelka-Munk equation, and the results are shown in FIG. 4.

Referring to FIG. 3, the $Cu_2O/TiO_2$ photocatalyst of Example 1 had the lowest emission intensity, compared with the emission intensity of the $TiO_2$ and $CuO/TiO_2$ photocatalysts of Comparative Examples 1 and 2, respectively. This result demonstrated that the $Cu_2O/TiO_2$ photocatalyst of Example 1 had improved absorbance of electrons generated by light so that the recombination of the absorbed electrons and holes was reduced.

Figure 4:
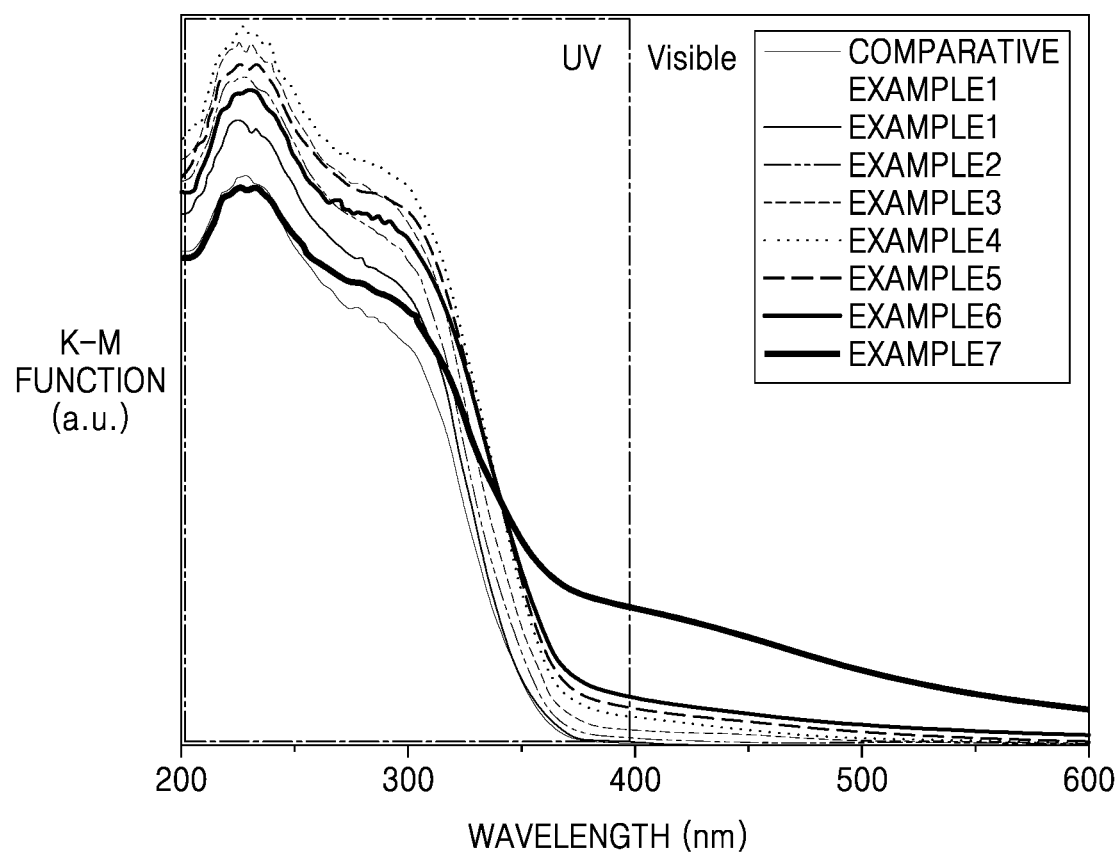
FIG. 4 is a graph of Kubelka-Munk (K-M) function (a.u.) versus wavelength (nm) for $Cu_2O/TiO_2$ and $TiO_2$ photocatalysts prepared according to Examples 1 to 7 and Comparative Example 1.

Referring to FIG. 4, the absorbances of the $Cu_2O/TiO_2$ photocatalysts of Examples 1 to 7 in the wavelength region of about 200 nm to about 600 nm were greater throughout the entire wavelength region than the absorbance of the $TiO_2$ photocatalyst of Comparative Example 1 in this wavelength region. Among these photocatalysts, the absorbance of the $Cu_2O/TiO_2$ photocatalyst of Example 4 had the highest absorbance in the wavelength region of about 200 nm to about 600 nm.

In addition, for specific comparison of the absorbance values of the $Cu_2O/TiO_2$ photocatalysts of Examples 1 to 7 and the $TiO_2$ photocatalyst of Comparative Example 1, the absorbance values at each wavelength range of each photocatalyst of Examples and Comparative Example were all summed and the average values thereof were used for comparison.

The absorbance values of the $Cu_2O/TiO_2$ photocatalysts of Examples 1 to 7 in the wavelength region of about 200 nm to about 600 nm were greater by at least about 40% than the absorbance values of the $TiO_2$ photocatalyst of Comparative Example 1 in this same wavelength region. The absorbance values of the $Cu_2O/TiO_2$ photocatalysts of Examples 1 to 7 in the wavelength region of about 200 nm to about 400 nm were greater by at least about 30% than the absorbance values of the $TiO_2$ photocatalyst of Comparative Example 1 in the same wavelength region.

In further detail, at a wavelength of 254 nm of UV-C which is representative ultraviolet light, the measured absorbance value of each of the $Cu_2O/TiO_2$ photocatalysts of Examples 1 to 7 were 47.519 a.u., and the measured absorbance value of the $TiO_2$ photocatalyst of Comparative Example 1 was 36.802 a.u. at the same wavelength.

That is, at a wavelength of 254 nm of ultraviolet light (i.e., UV-C light), the absorbance values of the $Cu_2O/TiO_2$ photocatalysts of Examples 1 to 7 were greater by at least about 30% than the absorbance values of the $TiO_2$ photocatalyst of Comparative Example 1 at the same wavelength.

At a wavelength of 320 nm of UV-B which is representative ultraviolet light, the measured absorbance values of each of the $Cu_2O/TiO_2$ photocatalysts of Examples 1 to 7 were 33.33 a.u., and the measured absorbance value of the $TiO_2$ photocatalyst of Comparative Example 1 was 21.336 a.u. at the same wavelength.

That is, at a wavelength of 320 nm of ultraviolet light (i.e., UV-B light), the absorbance values of the $Cu_2O/TiO_2$ photocatalysts of Examples 1 to 7 were greater by about 56% than the absorbance values of the $TiO_2$ photocatalyst of Comparative Example 1 at the same wavelength.

At a wavelength of 365 nm of UV-A which is the representative ultraviolet light, the measured absorbance values of each of the $Cu_2O/TiO_2$ photocatalysts of Examples 1 to 7 were 4.993 a.u., and the measured absorbance value of the $TiO_2$ photocatalyst of Comparative Example 1 was 1.364 a.u. at this same wavelength.

That is, at a wavelength of 365 nm of ultraviolet light (i.e., UV-A light), the absorbance values of the $Cu_2O/TiO_2$ photocatalysts of Examples 1 to 7 were greater by about 360% than the absorbance values of the $TiO_2$ photocatalyst of Comparative Example 1 at the same wavelength.

At a wavelength of 420 nm of the representative visible light, the measured absorbance values of each of the $Cu_2O/TiO_2$ photocatalysts of Examples 1 to 7 were 1.775 a.u., and the measured absorbance value of the $TiO_2$ photocatalyst of Comparative Example 1 was 0.021 a.u. at the same wavelength.

That is, at a wavelength of 420 nm of visible light, the absorbance values of the $Cu_2O/TiO_2$ photocatalysts of Examples 1 to 7 were greater by about 8500% than the absorbance value of the $TiO_2$ photocatalyst of Comparative Example 1 at the same wavelength.

Analysis Example 3

Analysis of Specific Surface Area of Carrier

To calculate the specific surface area of the $Cu_2O/TiO_2$ catalysts each immersed in ST-01 of Example 1 and P25 of Comparative Example 3, a nitrogen adsorption test was performed after degassing under a vacuum at 150° C. for 24 hours. In the nitrogen adsorption test, nitrogen was adsorbed to and desorbed from the catalyst powders of Examples and Comparative Examples, and based on a difference in amounts of adsorbed nitrogen and desorbed nitrogen, the specific surface area of each catalyst was calculated. As a nitrogen adsorption apparatus, a BELSORP-max by BEL Company was used. According to the Brunauer-Emmett-Teller (BET) method, the specific surface area within a relative nitrogen pressure range $(p/p_0)$ between 0 and 1.0 was calculated based on the $N_2$ adsorption-desorption isotherm obtained by the nitrogen adsorption test. The results are shown in FIG. 5.

Figure 5:
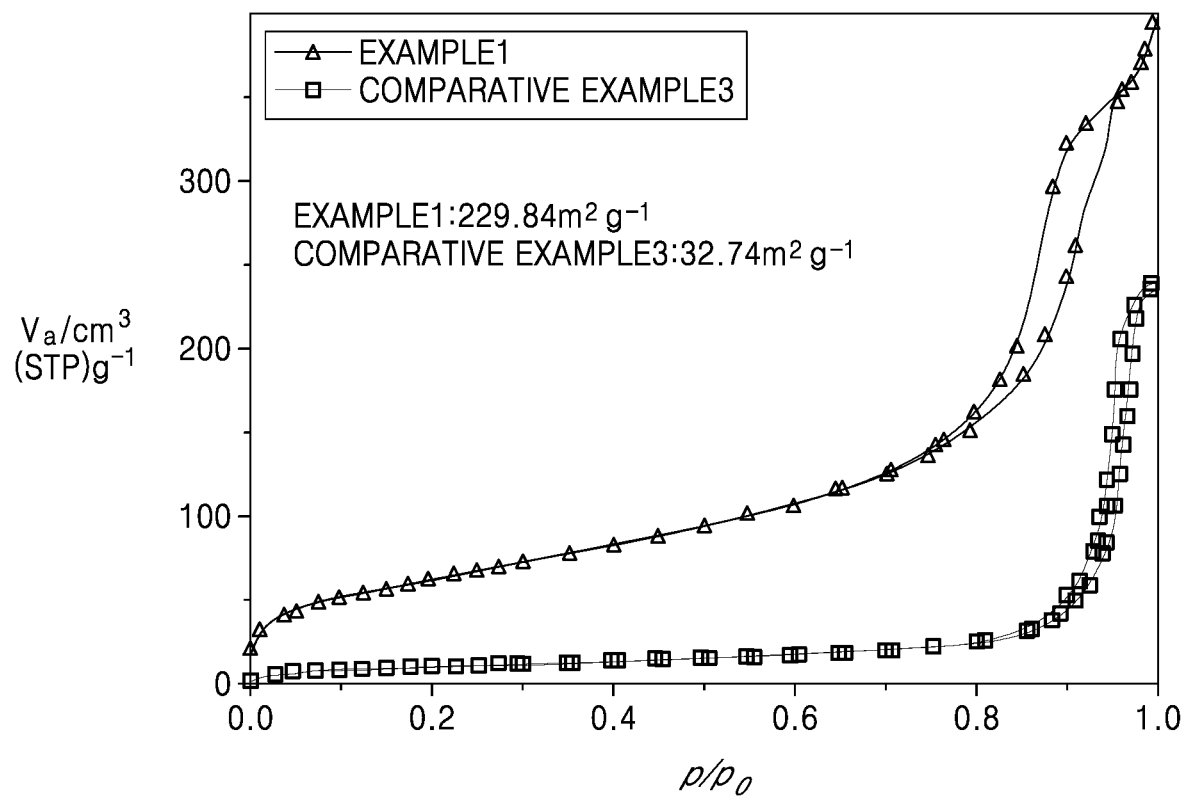
FIG. 5 is a graph of volume of nitrogen adsorbed ($cm^3/g$) versus relative pressure ($\rho/\rho_0$) and shows results of measuring specific surface areas of $Cu_2O/TiO_2$ catalysts prepared according to Example 1 and Comparative Example 3, each supported on ST-01 and P25.

Referring to FIG. 5, the surface area of the catalyst ($Cu_2O$/ST-01) in which copper was immersed in $TiO_2$ (ST-01) of Example 1 was about 230 $m^2g^{-1}$, and the surface area of the catalyst ($Cu_2O$/P25) in which copper was immersed in $TiO_2$ (P25) of Comparative Example 3 was about 33 $m^2g^{-1}$, showing a 7-fold difference in the specific surface area. Since a catalyst is mainly reacted on a surface thereof, it is regarded that the greater the specific surface area of the catalyst, the larger the reaction area on the surface of the catalyst.

Evaluation Example 1

Evaluation of Photocurrent Density and Charge Carrier Density

Photocurrent density and charge carrier density of the $Cu_2O/TiO_2$, $TiO_2$, and $CuO/TiO_2$ photocatalysts of Example 1 and Comparative Examples 1 and 2 were evaluated. The results are shown in FIGS. 6 and 7, respectively.

Each of the photocatalysts of Examples and Comparative Examples was immersed in 0.1 molar (M) phosphate buffer solution, and an LED lamp having a wavelength of 365 nm was used for irradiation with an intensity of 50 milliwatts per square centimeter ($mW/cm^2$) at 0.5 V vs. Ag/AgCl potential for about 20 seconds to about 30 seconds, about 60 seconds to about 70 seconds, and about 100 seconds to about 110 seconds. Then, the photocurrent density before/after the irradiation of ultraviolet ray was measured.

Referring to FIG. 6, the photocurrent density of the $Cu_2O/TiO_2$ photocatalyst of Example 1 was greater than the photocurrent density of the $TiO_2$ photocatalyst and the $CuO/TiO_2$ photocatalyst of Comparative Examples 1 and 2, respectively.

Among the photocatalysts, the average photocurrent densities of the $Cu_2O/TiO_2$, $TiO_2$, and $CuO/TiO_2$ catalysts of Example 1 and Comparative Examples 1 and 2 under irradiation for about 100 seconds to about 110 seconds were 25.29 $\mu A/cm^2$, 8.32 $\mu A/cm^2$, and 13.03 $\mu A/cm^2$, respectively. That is, the average photocurrent density of $Cu_2O/TiO_2$ photocatalyst of Example 1 under irradiation for about 100 seconds to about 110 seconds was greater by about 300% than the average photocurrent density of the $TiO_2$ photocatalyst of Comparative Example 1 under the same conditions.

In addition, when each of the photocatalysts of Examples and Comparative Examples was immersed in 0.1 M phosphate buffer and a potential in a range of about −0.5 V to about 2.0 V (vs. Ag/AgCl) was applied thereto, charge carrier density of the photocatalysts was obtained according to Equation 1:

$$\frac{1}{C_{sc}^2} = \left(\frac{2}{e\varepsilon_0\varepsilon N_D}\right)\left[(E_S - E_{FB}) - \frac{kT}{e}\right] \qquad \text{Equation 1}$$

In Equation 1, No denotes charge carrier density ($cm^{-3}$), $C_{sc}$ denotes space charge capacity (F $cm^{-2}$), e denotes elementary charge (1.602×10$^{-19}$ C), ε denotes a non-dielectric constant of an electrode material (48 for anatase-type $TiO_2$), $\varepsilon_0$ denotes vacuum permittivity (8.85×10$^{-12}$ $N^{-1}$ $C^2$, $m^{-2}$), $E_s$ denotes applied potential (V), $E_{FB}$ denotes a flat band potential (V), k denotes a Boltzmann constant (1.38×10$^{-23}$ J $K^{-1}$), T denotes an absolute temperature (K).

Referring to FIG. 7, the charge carrier densities of the $Cu_2O/TiO_2$, $TiO_2$, and $CuO/TiO_2$ photocatalysts of Example 1 and Comparative Examples 1 and 2 were 3.06×10$^{20}$/$cm^3$, 1.73×10$^{20}$/$cm^3$, and 2.81×10$^{20}$/$cm^3$, respectively. That is, the charge carrier density of the $Cu_2O/TiO_2$ photocatalyst of Example 1 was greater by about 80% than the charge carrier density of the $TiO_2$ photocatalyst of Comparative Example 1.

Evaluation Example 2

Impedance Evaluation

For the $Cu_2O/TiO_2$, $TiO_2$, and $CuO/TiO_2$ photocatalysts of Example 1 and Comparative Examples 1 and 2, impedance was measured by using a potentiostat (manufactured by WonATech. Inc.) according to the 2-probe method. Here, a frequency range was between about 0.1 megahertz (MHz) and about 0.1 Hz. A Nyquist plot obtained by the impedance measurement is shown in FIG. 8.

Figure 8:
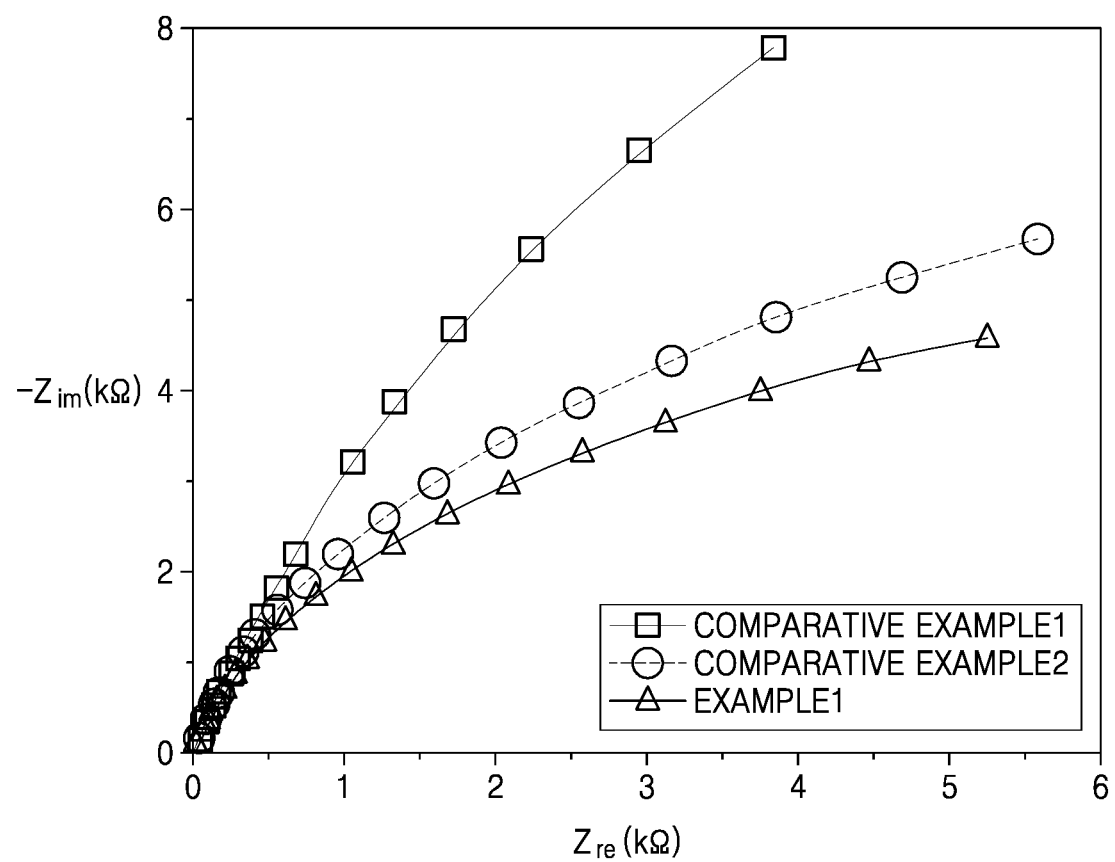
FIG. 8 is a graph of imaginary resistance ($-Z_{im}$, ohm, $\Omega$) versus real resistance ($Z_{re}$, $\Omega$) and is a Nyquist plot showing results of measuring impedance after irradiation of ultraviolet rays (e.g., UVA) to $Cu_2O/TiO_2$, $TiO_2$, and $CuO/TiO_2$ photocatalysts prepared according to Example 1 and Comparative Examples 1 and 2.

Referring to FIG. 8, the impedance of the $Cu_2O/TiO_2$ photocatalyst of Example 1 was less than the impedance of the $TiO_2$ photocatalyst and the $CuO/TiO_2$ photocatalysts of Comparative Examples 1 and 2, respectively.

Evaluation Example 3

Evaluation of Decomposition Efficiency of Gaseous VOCs

For the $Cu_2O/TiO_2$, $TiO_2$, and $CuO/TiO_2$ photocatalysts of Example 1 and Comparative Examples 1 and 2, the decomposition efficiency of gaseous VOCs was evaluated. The results are shown in FIG. 16.

The evaluation of the decomposition efficiency of the gaseous VOCs was performed as follows.

Figure 15:
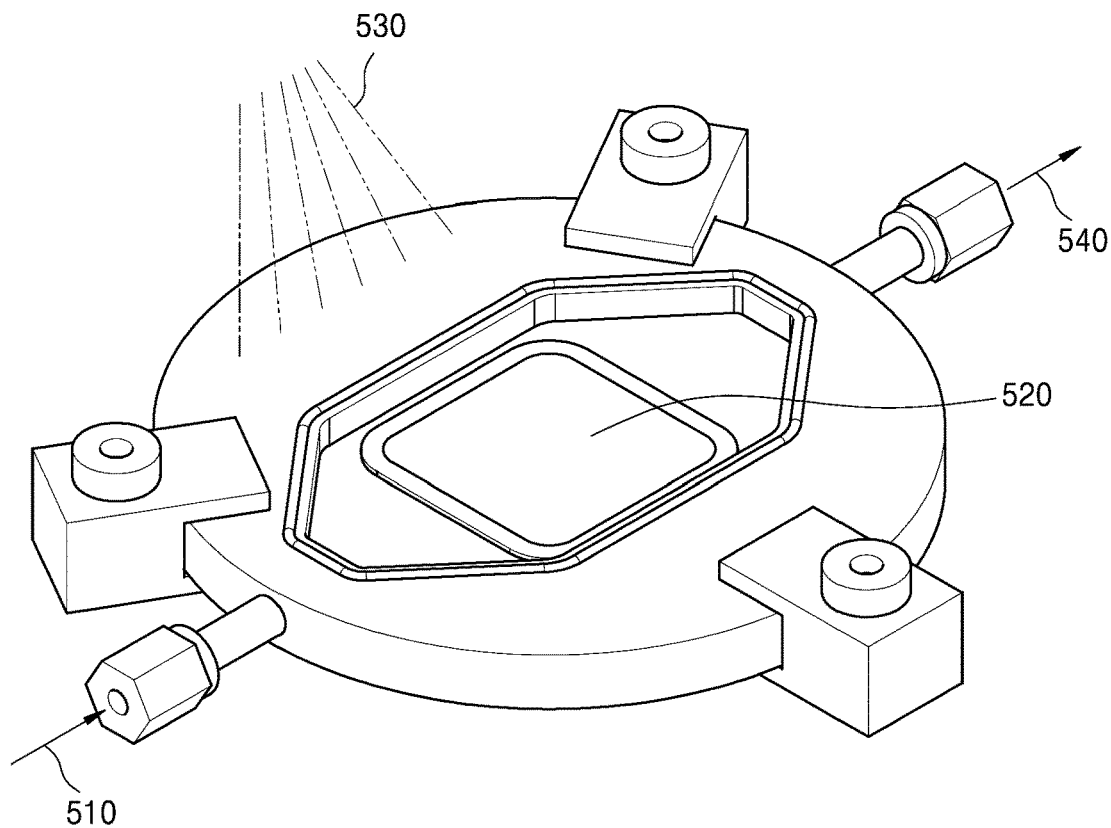
FIG. 15 is a schematic view of a reactor for measuring decomposition efficiency of gaseous VOCs.
Figure 16:
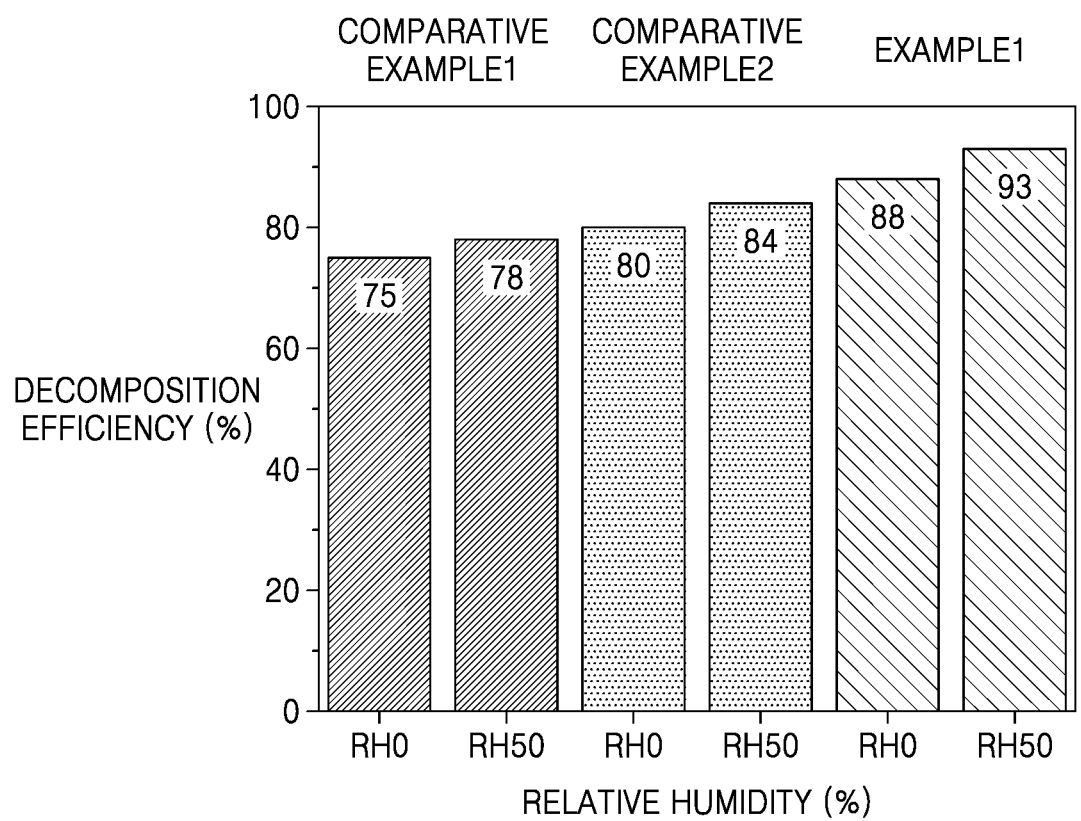
FIG. 16 is a graph of decomposition efficiency (%) versus relative humidity (%) and shows results of measuring decomposition efficiency of gaseous VOCs by $Cu_2O/TiO_2$, $TiO_2$, and $CuO/TiO_2$ photocatalyst prepared according to Example 1 and Comparative Examples 1 and 2 at 23° C. and a relative humidity of 0% and 50%, by using a reactor.

As shown in FIG. 15, the photocatalyst powder 520 was press-fixed onto a holder having a size of 2×2 cm$^2$ in a reactor, and then air having a composition of $N_2$ 80% and $O_2$ 20% was continuously injected through a gas inlet 510 at a speed of 1 liter per minute (L/min). At the same time, 20 parts per million (ppm) of gaseous VOCs were continuously injected. Then, after covering the reactor with quartz for sealing, light was irradiated thereon with a UV-LED lamp 530 to measure the conversion concentration to $CO_2$ in a flow system. Afterwards, the decomposition efficiency of the gaseous VOCs were evaluated according to Equation 2:

decomposition efficiency (%)={(concentration of converted $CO_2$)/(initial concentration of VOCs)×100%}. (2)

Referring to FIG. 165, in an environment of a temperature of 23° C. and relative humidity (RH) of 0% for one case and a temperature of 23° C. and RH of 50% for another case, the decomposition efficiency of the gaseous VOCs by the $Cu_2O/TiO_2$ photocatalyst of Example 1 were 88% and 93%, respectively. The decomposition efficiency of the gaseous VOCs by the $Cu_2O/TiO_2$ photocatalyst of Example 1 was greater by about 8% to about 13% in the environment of a temperature of 23° C. and RH of 0% and greater by about 9% to about 15% in the environment of a temperature of 23° C. and RH of 50%, compared to the decomposition efficiency of the gaseous VOCs by the $TiO_2$ and $CuO/TiO_2$ photocatalysts of Comparative Examples 1 and 2.

Accordingly, it was confirmed that the $Cu_2O/TiO_2$ photocatalyst of Example 1 had excellent decomposition efficiency on the gaseous VOCs compared with the $TiO_2$ and $CuO/TiO_2$ photocatalysts of Comparative Examples 1 and 2, in all environments regardless of the presence of moisture.

Evaluation Example 4

Evaluation of Removal Efficiency and Removal Reaction Rate of VOCs

For the $Cu_2O/TiO_2$ and $TiO_2$ photocatalysts of Example 1 and Comparative Example 1, removal efficiency (%) and removal reaction rate ($g^{-1}min^{-1}$ or $min^{-1}$) of gaseous VOCs were evaluated. The results are shown in Tables 1 and 2, respectively.

The decomposition efficiency and removal reaction rate of the gaseous VOCs were evaluated as follows.

A photocatalyst-containing an aqueous solution (having a solid content of about 10%) in which each photocatalyst of Example and Comparative Examples was dispersed in distilled water was obtained. Separately, a porous cordierite support (having a cell size of about 100 cpsi) having a honeycomb structure of 7 cm×3.5 cm×1 cm was prepared. After dipping the porous cordierite support in the photocatalyst-containing aqueous solution, followed by drying, a catalyst filter composed of the porous cordierite support coated with particles or clusters of the photocatalyst was prepared as shown in FIG. 9. Afterwards, as shown in FIG. 10A, a catalyst module 10 including a catalyst filter 11, a UV-A LED lamp 12 (having a wavelength of about 360 nm to about 365 nm), and a circulation fan 13 was manufactured. A 100 L chamber installed with a gas inlet and a gas outlet was prepared, and the catalyst module 10 was mounted therein as shown in FIG. 10B. The UV-A LED lamp 12 (having a wavelength of about 360 nm to about 365 nm) and the circulation fan (13) were each connected to a power source. In the chamber maintaining the environment of a temperature of 23° C. and RH of 45±5%, five different gaseous VOCs, i.e., gaseous formaldehyde, gaseous ammonia, gaseous acetaldehyde, gaseous formaldehyde, and gaseous acetic acid, and gaseous toluene, were sequentially injected at a concentration of 10 ppm and a rate of 10 L/min through the gas inlet by using a mass flow controller (MFC). The initial concentration of each of these gaseous VOCs was measured, and after 30 minutes, the concentration of each gas removed through a photocatalytic reaction was measured. The removal efficiency for each of the five different gaseous VOCs was calculated by substituting the measured concentrations to Equation 3, and the average value of these removal efficiency values was determined to be the removal efficiency:

removal efficiency (%)=[{1−(concentration of gaseous VOC at gas outlet)/(concentration of gaseous VOC at gas inlet)}×100%]. (3)

In addition, the VOC removal rate per gram of photocatalyst, i.e., the removal rate of the five different VOCs by the photocatalysts of Example 1 and Comparative Example 1, were measured, and represented as the removal reaction rate ($g^{-1}min^{-1}$).

In Reference Example 1, the catalyst module 10 was not mounted in the chamber. For the photocatalyst of Reference Example 1, the measurement and evaluation were performed in a similar manner as described above, except that the removal reaction rate ($min^{-1}$) was set by measuring initial reduction rate of the gaseous VOCs.

TABLE 1

| Sample | Removal efficiency (%)-gaseous formaldehyde | Removal efficiency (%)-gaseous ammonia | Removal efficiency (%)-gaseous acetaldehyde | Removal efficiency (%)-gaseous acetic acid | Removal efficiency (%)-gaseous toluene | Average removal efficiency (%)-gaseous VOCs |
|---|---|---|---|---|---|---|
| Reference Example 1 | 64 | 9 | 43 | 78 | 63 | 51.4 |
| Comparative Example 1 | 89 | 64 | 59 | 89 | 49 | 70 |
| Example 1 | 81 | 93 | 83 | 93 | 62 | 82.4 |

TABLE 2

| Division | Removal rate - gaseous formaldehyde ($g^{-1}min^{-1}$) | Removal rate - gaseous ammonia ($g^{-1}min^{-1}$) | Removal rate - gaseous acetaldehyde ($g^{-1}min^{-1}$) | Removal rate - gaseous acetic acid ($g^{-1}min^{-1}$) | Removal rate - gaseous toluene ($g^{-1}min^{-1}$) |
|---|---|---|---|---|---|
| Reference Example 1 ($min^{-1}$) | 0.0386 | 0.0033 | 0.0213 | 0.1217 | 0.0835 |
| Comparative Example 1 | 0.0797 | 0.0425 | 0.225 | 0.0836 | 0.0298 |
| Example 1 | 0.1438 | 0.1671 | 0.0612 | 0.1986 | 0.0706 |

Referring to Table 1, the average removal efficiency (%) of the five gaseous VOCs by the $Cu_2O/TiO_2$ photocatalyst of Example 1 was 82.4%. The average removal efficiency (%) of the five gaseous VOCs by the $Cu_2O/TiO_2$ photocatalyst of Example 1 was greater by 2.4% and by 31% than the $TiO_2$ photocatalyst of Comparative Example 1 and the photocatalyst of Reference Example 1, respectively, that were naturally reduced because they did not include the photocatalyst.

Referring to Table 2, the removal reaction rate ($g^{-1}min^{-1}$) of the five gaseous VOCs by the $Cu_2O/TiO_2$ photocatalyst of Example 1 was greater than the $TiO_2$ photocatalyst of Comparative Example 1 and the photocatalyst of Reference Example 1 respectively, that were naturally reduced because they did not include the photocatalyst.

According to the one or more exemplary embodiments, a photocatalyst may include a second metal oxide having a surface on which a first metal oxide is disposed thereon. The photocatalyst may have improved absorption of light in the entire wavelength regions of ultraviolet light and visible light, have a high decomposition efficiency and a high removal efficiency on gaseous VOCs regardless the presence of moisture, and have a high reaction rate with gaseous VOCs. Therefore, the photocatalyst may be applied to an air purification system for decomposition and removal of gaseous VOCs.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

What is claimed is:

1. A photocatalyst, comprising:
a first metal oxide; and
a second metal oxide,
wherein the first metal oxide is disposed on a surface of the second metal oxide, and
wherein absorbance of the photocatalyst in a wavelength region of about 200 nanometers to about 600 nanometers is about 5% to about 50% greater than an absorbance of $TiO_2$ in the wavelength region of about 200 nanometers to about 600 nanometers,
wherein
the first metal oxide consists of nano-sized primary particles, and
the second metal oxide consists of micro-sized primary particles or secondary particles each comprised of a plurality of micro-sized primary particles.

2. The photocatalyst of claim 1, wherein the absorbance of the photocatalyst in a wavelength region of about 200 nanometers to about 400 nanometers is about 30% to about 400% greater than an absorbance of $TiO_2$ in the wavelength region of about 200 nanometers to about 400 nanometers.

3. The photocatalyst of claim 1, wherein a first metal of the first metal oxide has an oxidation number of +1.

4. The photocatalyst of claim 1, wherein the first metal oxide comprises at least one of copper, platinum, gold, silver, zinc, manganese, or a combination thereof.

5. The photocatalyst of claim 1, wherein the first metal oxide comprises at least one of $Cu_2O$, $Pt_2O$, $Au_2O$, $Ag_2O$, $Zn_2O$, $Mn_2O$, or a combination thereof.

6. The photocatalyst of claim 1, wherein an amount of the first metal oxide is about 0.5 parts by weight to about 10 parts by weight, based on 100 parts by weight of the second metal oxide.

7. The photocatalyst of claim 1, wherein the second metal oxide comprises at least one of titanium, zinc, zirconium, tantalum, tungsten, or a combination thereof.

8. The photocatalyst of claim 1, wherein the second metal oxide comprises at least one of $TiO_2$, $ZnO$, $ZrO_2$, $Ta_2O_5$, $WO_3$, or a combination thereof.

9. The photocatalyst of claim 1, wherein the first metal oxide and the second metal oxide are each independently in the form of wires, clusters, crystals, or a combination thereof.

10. The photocatalyst of claim 1 wherein a specific surface area of the second metal oxide is about 100 square meters per gram to about 500 square meters per gram.

11. The photocatalyst of claim 1, wherein average photocurrent density of the photocatalyst is about 20 microamperes per square centimeter to about 50 microamperes per square centimeter at a potential of 0.5 Volts vs. Ag/AgCl in response to irradiation having a wavelength of about 360 nanometers and about 365 nanometers.

12. The photocatalyst of claim 1, wherein a charge carrier density of the photocatalyst is about $3.0 \times 10^{20}/cm^3$ to about $4.0 \times 10^{20}/cm^3$, as determined by Equation 1:

$$\frac{1}{C_{sc}^2} = \left(\frac{2}{e\varepsilon_0\varepsilon N_D}\right)\left[(E_S - E_{FB}) - \frac{kT}{e}\right] \quad \text{Equation 1}$$

wherein, in Equation 1,
$N_D$ denotes charge carrier density,
$C_{sc}$ denotes space charge capacity,
e denotes elementary charge,
ε denotes a non-dielectric constant of an electrode material,
$ε_0$ denotes vacuum permittivity,
$E_s$ denotes applied potential, $E_{FB}$ denotes flat band potential,
k denotes a Boltzmann constant, and
T denotes an absolute temperature,
when measured in a 0.1 molar phosphate buffer solution and at a potential of about −0.5 Volts to about 2.0 Volts vs. Ag/AgCl.

13. The photocatalyst of claim 1, wherein the photocatalyst is used for decomposition and removal of a gaseous volatile organic compound.

14. The photocatalyst of claim 1, wherein the photocatalyst has:
a decomposition efficiency for a gaseous volatile organic compound that is greater than or equal to about 85% according to Equation 2, when measured at 23° C. and a relative humidity of 0%, and
a decomposition efficiency for a gaseous volatile organic compound that is greater than or equal to about 90% according to Equation 2, when measured at 23° C. and a relative humidity of 50%:

decomposition efficiency (%)={(concentration of converted $CO_2$)/(initial concentration of gaseous volatile organic compound)×100%}.  Equation 2

15. A catalyst filter, comprising:
a porous ceramic support; and
a photocatalyst disposed on a surface of the porous ceramic support,
wherein the photocatalyst comprises:
a first metal oxide; and
a second metal oxide,
wherein the first metal oxide is disposed on a surface of the second metal oxide, and
wherein absorbance of the photocatalyst in a wavelength region of about 200 nanometers to about 600 nanometers is about 5% to about 50% greater than an absorbance of $TiO_2$ in the wavelength region of about 200 nanometers to about 600 nanometers,
wherein
the first metal oxide consists of nano-sized primary particles, and
the second metal oxide consists of micro-sized primary particles or secondary particles each comprised of a plurality of micro-sized primary particles.

16. The catalyst filter of claim 15, wherein the porous ceramic support has a honeycomb structure.

17. The catalyst filter of claim 15, wherein the porous ceramic support is a single laminate or a multi-layered laminate.

18. A catalyst module, comprising:
a catalyst filter; and
an energy supply source,
wherein the energy supply source supplies energy to the catalyst filter for catalyst activation,
wherein the catalyst filter comprises:
a porous ceramic support; and
a photocatalyst disposed on a surface of the porous ceramic support,
wherein the photocatalyst comprises:
a first metal oxide; and
a second metal oxide,
wherein the first metal oxide is disposed on a surface of the second metal oxide, and
wherein absorbance of the photocatalyst in a wavelength region of about 200 nanometers to about 600 nanometers is about 5% to about 50% greater than an absorbance of $TiO_2$ in the wavelength region of about 200 nanometers to about 600 nanometers,
wherein
the first metal oxide consists of nano-sized primary particles, and
the second metal oxide consists of micro-sized primary particles or secondary particles each comprised of a plurality of micro-sized primary particles.

19. The catalyst module of claim 18, wherein the energy supply source comprises at least one of a light energy supply source, an electric energy supply source, an ion energy supply source, or a heat energy supply source.

20. The catalyst module of claim 18, wherein the energy supply source comprises an ultraviolet light emitting diode.

21. The catalyst module of claim 18, further comprising a circulation fan.

22. An air purification system, comprising:
a supplier that supplies air comprising a gaseous volatile organic compound; and
an air purifier comprising a catalyst module,
wherein the air purification system substantially decomposes and substantially removes the gaseous volatile organic compound from the air supplied from the supplier, and discharges a purified air from which the gaseous volatile organic compound is substantially decomposed and substantially removed,
wherein the catalyst module comprises:
a catalyst filter; and
an energy supply source,
wherein the energy supply source supplies energy to the catalyst filter for catalyst activation,
wherein the catalyst filter comprises:
a porous ceramic support; and
a photocatalyst disposed on a surface of the porous ceramic support,
wherein the photocatalyst comprises:
a first metal oxide; and
a second metal oxide,
wherein the first metal oxide is disposed on a surface of the second metal oxide, and
wherein absorbance of the photocatalyst in a wavelength region of about 200 nanometers to about 600 nanometers is about 5% to about 50% greater than an absorbance of $TiO_2$ in the wavelength region of about 200 nanometers to about 600 nanometers,
wherein
the first metal oxide consists of nano-sized primary particles, and
the second metal oxide consists of micro-sized primary particles or secondary particles each comprised of a plurality of micro-sized primary particles.

23. The air purification system of claim 22, further comprising an analyzer that identifies the gaseous volatile organic compound and a concentration of the gaseous volatile organic compound present in the air purifier.

24. The air purification system of claim 22, wherein the air purifier further comprises:
a body comprising a gas inlet and a gas outlet,
wherein the gas inlet is disposed on a first side surface and the gas outlet is disposed on a second side surface parallel to the first side surface; and
a catalyst module disposed in the body.

25. The air purification system of claim 22, wherein the supplier comprises:
a first supplier for directly supplying the gaseous volatile organic compound; and
a second supplier for supplying the gaseous volatile organic compound by mixing a carrier gas and a process gas and vaporizing the mixture.

26. The air purification system of claim 22, wherein the gaseous volatile organic compound comprises at least one of gaseous formaldehyde, gaseous ammonia, gaseous acetaldehyde, gaseous acetic acid, gaseous toluene, or a combination thereof.

27. The air purification system of claim 22, wherein a removal efficiency for the gaseous formaldehyde, the gaseous ammonia, the gaseous acetaldehyde, the gaseous acetic acid, and the gaseous toluene is greater than or equal to about 80% according to Equation 3, when measured at 23° C. and a relative humidity of 45±5%:

$$\text{removal efficiency (\%)} = [\{1-(\text{concentration of gaseous VOCs at gas outlet})/(\text{concentration of gaseous VOCs at gas inlet})\} \times 100\%]. \quad \text{Equation 3}$$

\* \* \* \* \*